(12) United States Patent
Uesugi et al.

(10) Patent No.: US 11,872,928 B2
(45) Date of Patent: Jan. 16, 2024

(54) VEHICULAR LAMP

(71) Applicant: KOITO MANUFACTURING CO., LTD., Tokyo (JP)

(72) Inventors: Atsushi Uesugi, Shizuoka (JP); Kentarou Murakami, Shizuoka (JP); Yuki Kubo, Shizuoka (JP); Tatsuro Hayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/682,541

(22) Filed: Feb. 28, 2022

(65) Prior Publication Data

US 2022/0176870 A1 Jun. 9, 2022

Related U.S. Application Data

(63) Continuation of application No. PCT/JP2020/031858, filed on Aug. 24, 2020.

(30) Foreign Application Priority Data

Aug. 28, 2019 (JP) ................................. 2019-155855
Aug. 28, 2019 (JP) ................................. 2019-155856

(51) Int. Cl.
*B60Q 1/08* (2006.01)
*F21S 41/151* (2018.01)
(Continued)

(52) U.S. Cl.
CPC .............. *B60Q 1/08* (2013.01); *B60Q 1/1415* (2013.01); *F21S 41/151* (2018.01); *B60Q 2300/054* (2013.01); *F21Y 2115/10* (2016.08)

(58) Field of Classification Search
CPC ........ B60Q 1/08; B60Q 1/1415; F21S 41/151
See application file for complete search history.

(56) References Cited

U.S. PATENT DOCUMENTS

| | | | |
|---|---|---|---|
| 2006/0072314 A1* | 4/2006 | Rains ................... | H05B 45/20 362/231 |
| 2006/0077675 A1* | 4/2006 | Fleming ............... | B60Q 1/076 362/466 |

(Continued)

FOREIGN PATENT DOCUMENTS

| | | |
|---|---|---|
| DE | 102007040042 A1 | 2/2009 |
| EP | 2567867 A2 | 3/2013 |

(Continued)

OTHER PUBLICATIONS

International Preliminary Report on Patentability (PCT/IB/373) and Written Opinion (PCT/ISA/237) with translation dated Mar. 1, 2022 by the International Bureau of WIPO for International Patent Application No. PCT/JP2020/031858. (7 pages).

(Continued)

*Primary Examiner* — Bryon T Gyllstrom
(74) *Attorney, Agent, or Firm* — BUCHANAN INGERSOLL & ROONEY PC

(57) ABSTRACT

An automotive lamp includes a variable light distribution lamp and a controller. When a first light distribution pattern is to be changed to a second light distribution pattern, and when a difference in the number of shaded portions between the first light distribution pattern and the second light distribution pattern is one, the controller switches a control method for gradually changing the light distribution pattern according to a position relation between the shaded portions included in the first light distribution pattern and the shaded portions included in the second light distribution pattern.

24 Claims, 22 Drawing Sheets

(51) Int. Cl.
*B60Q 1/14* (2006.01)
*F21Y 115/10* (2016.01)

(56) References Cited

U.S. PATENT DOCUMENTS

| | | | | |
|---|---|---|---|---|
| 2009/0073710 | A1* | 3/2009 | Sormani | F21S 41/153 |
| | | | | 362/509 |
| 2009/0279317 | A1* | 11/2009 | Tatara | B60Q 1/08 |
| | | | | 362/465 |
| 2015/0042225 | A1* | 2/2015 | Fukayama | B60Q 1/143 |
| | | | | 315/82 |
| 2015/0055357 | A1* | 2/2015 | Nakatani | F21S 41/151 |
| | | | | 362/466 |
| 2016/0250964 | A1* | 9/2016 | Takagaki | B60Q 1/08 |
| | | | | 362/466 |
| 2016/0332560 | A1 | 11/2016 | Nakatani | |
| 2017/0057402 | A1 | 3/2017 | Uesugi et al. | |
| 2017/0299139 | A1* | 10/2017 | Masuda | F21S 41/32 |

FOREIGN PATENT DOCUMENTS

| | | |
|---|---|---|
| EP | 3020602 A1 | 5/2016 |
| EP | 3028897 A1 | 6/2016 |
| JP | 2008205357 A | 9/2008 |
| JP | 2012224317 A | 11/2012 |
| JP | 2018187979 A | 11/2018 |
| WO | 2016104319 A1 | 6/2016 |
| WO | 2016167250 A1 | 10/2016 |

OTHER PUBLICATIONS

International Search Report (PCT/ISA/210) with translation dated Sep. 29, 2020, by the Japan Patent Office as the International Searching Authority for International Application No. PCT/JP2020/031858. (4 pages).

Extended European Search Report issued in EP Application No. 20858660.2; dated Sep. 6, 2022; 9 pages.

* cited by examiner

VEHICULAR LAMP

BACKGROUND

1. Technical Field

The present disclosure relates to an automotive lamp employed in an automobile or the like.

2. Description of the Related Art

Typical automotive lamps are capable of switching between a low-beam mode and a high-beam mode. The low-beam mode is used to illuminate a close range in the vicinity of the user's vehicle with a predetermined light intensity. In the low-beam mode, light distribution is determined so as to prevent glare being imparted to an oncoming vehicle or a leading vehicle. The low-beam mode is mainly used when the vehicle is traveling in an urban area. In contrast, the high-beam mode is used to illuminate a distant range over a wide area ahead of the vehicle with a relatively high light intensity. The high-beam mode is mainly used when the vehicle is traveling at high speed along a road where there are a small number of oncoming vehicles and leading vehicles. Accordingly, the high-beam mode provides the driver with high visibility, which is an advantage, as compared with the low-beam mode. However, the high-beam mode has a problem of imparting glare to a pedestrian or a driver of a vehicle ahead of the vehicle.

In recent years, the Adaptive Driving Beam (ADB) technique has been proposed in which a high-beam distribution pattern is dynamically and adaptively controlled based on the state of the surroundings of a vehicle. With the ADB technique, the presence or absence of a leading vehicle, an oncoming vehicle, or a pedestrian ahead of the vehicle is detected, and the illumination is reduced for a region that corresponds to such a vehicle or pedestrian thus detected, thereby reducing glare imparted to such a vehicle or pedestrian.

As a method for providing the ADB function, various methods have been proposed, such as a shutter method in which an actuator is controlled, a rotary method, an LED array method, and so forth. With the shutter method or the rotary method, this allows a shaded portion to have a continuously variable width. However, the number of shaded portions is limited to one. The LED array method allows multiple shaded portions to be designed. However, the width of each shaded portion is limited depending on the illumination width of each LED chip. Thus, the LED array method leads to discrete shaded portions, which is a problem.

In order to solve these problems, the present applicant has proposed a blade scanning method as an ADB method (see PCT WO2016/104319A1 and PCT WO2016/167250A1). In the blade scanning method, light is made incident to a rotated reflector (blade), and the incident light is reflected with an angle that corresponds to the rotational position of the reflector. Furthermore, the lighting on/off of a light source or the light amount thereof is changed according to the rotational position of the reflector while scanning the reflected light to a forward region in front of the vehicle, such that the variable light distribution lamp forms a desired light distribution pattern in front of the vehicle.

1. A scanning variable light distribution lamp is capable of generating two or more shaded portions. FIGS. 1A and 1B are diagrams for explaining a transition of a light distribution pattern. FIG. 1A shows an example of the light distribution pattern. In this example, two objects (leading vehicle or oncoming vehicle) 600 and 601 are detected by a sensor, and the positions of the objects are each set to a shaded portion so as to prevent glare being imparted to the objects 600 and 601. The light distribution pattern 500_1 includes two shaded portions 502 and 503.

FIG. 1B shows another example of the light distribution pattern. A light distribution pattern 500_2 includes a single shaded portion 504. When the light distribution pattern 500_1 shown in FIG. 1A is switched to the light distribution pattern 500_2 shown in FIG. 1B, i.e., when the number of objects to be shaded is reduced from two to one, in a case in which the shaded portion that corresponds to a target object that has disappeared from view is instantly illuminated, this leads to visual guidance to this portion, which leads to a sensation of discomfort.

It is an exemplary purpose of an embodiment of the present invention to provide an automotive lamp with a reduced sensation of discomfort.

2. The present inventors have investigated a lamp configured as a combination of a scanning lamp and a non-scanning lamp. FIGS. 2A through 2C are diagrams for explaining a light distribution pattern formed by such a combination of a scanning lamp and a non-scanning lamp. FIG. 2A shows a light distribution pattern 900 in a normal state. The light distribution pattern 900 includes a scanning region 910 formed by the scanning lamp and non-scanning regions 920 and 922 formed by the non-scanning lamp. The scanning lamp repeatedly scans an illumination spot 912 at 100 Hz or more in the horizontal direction so as to illuminate the scanning region 910. The non-scanning lamp illuminates the non-scanning regions 920 and 922.

The lamp provides variable light distribution by inserting a shaded portion at a desired position in the scanning region 910 and by switching the on/off state of the non-scanning regions 920 and 922.

FIGS. 2A and 2B each show an example of the light distribution control supported by the lamp employing a combination of the scanning method and the non-scanning method. FIG. 2B shows a light distribution pattern 901 when there is a target object (which will be referred to as a "target object to be shaded" hereafter, e.g., a leading vehicle in this example) 800, which is to be shaded in order to prevent glare, in the scanning region 910. In this case, a shaded portion 916 is set in the scanning region 910. During a period in which the illumination spot 912 passes through the shaded portion, the scanning lamp turns off the illumination spot 912.

FIG. 2C shows a light distribution pattern 902 when there are target objects (a leading vehicle 800 and an oncoming vehicle 802 in this example), which are to be shaded in order to prevent glare, in the scanning region 910 and the non-scanning region 922. In this case, the shaded portion 916 is set in the scanning region 910, and the non-scanning region 922 is turned off.

As a result of investigating the transition from the light distribution pattern 901 shown in FIG. 2B to the light distribution pattern 902 shown in FIG. 2C, the present inventors have come to recognize the following problem. In a case in which the light distribution pattern 901 is instantly switched to the light distribution pattern 902, a bright portion instantly becomes a dark portion. Accordingly, such an arrangement has the potential to involve a sensation of discomfort imparted to the driver. In order to solve such a problem, there is a need to provide a control operation for gradually changing the light distribution pattern from the light distribution pattern 901 to the light distribution pattern 902 via a transition time of several hundred ms to several seconds.

FIG. 3 is a diagram for explaining a control method for gradually changing the light distribution pattern. Before the time point $t_0$, the light distribution pattern 901 is formed. At the time point $t_0$, the light distribution pattern 902 after the transition is set. Light distribution patterns 903 and 904 are intermediate light distribution patterns that occur at the time points $t_1$ and $t_2$ in the transition.

At the time point $t_1$ immediately after the time point $t_0$, the non-scanning lamp is turned off so as to turn off the right-side scanning region 922. Furthermore, the scanning lamp moves the right end of the shaded portion 916 toward the right side in the scanning region 910 with time. Subsequently, when the right-end position OR of the shaded portion 916 reaches the right end of the scanning region 910 (at the timepoint $t_3$), the transition ends.

In the control method for gradually changing the light distribution pattern shown in FIG. 3, in the transition, as shown in the example at the time point $t_2$, an illuminated portion 914R of the scanning region 910 remains in the non-scanning region 922 after the non-scanning region 922 is turned off. This has the potential to involve a sensation of discomfort imparted to the driver due to the remaining illuminated portion 914R.

SUMMARY

1. An embodiment of the present invention relates to an automotive lamp. The automotive lamp includes: a variable light distribution lamp; and a controller structured to control the variable light distribution lamp such that the variable light distribution lamp forms a light distribution pattern indicated by control data. When a first light distribution pattern is to be changed to a second light distribution pattern, and when a difference in the number of shaded portions between the first light distribution pattern and the second light distribution pattern is one, the controller switches a control method for gradually changing the light distribution pattern according to a position relation between the shaded portions included in the first light distribution pattern and the shaded portions included in the second light distribution pattern.

2. Another embodiment of the present invention also relates to an automotive lamp. The automotive lamp includes: a scanning lamp structured to scan a beam in the horizontal direction in a first range of $\theta_1$ to $\theta_2$; and a non-scanning lamp structured to illuminate a second range of $\theta_3$ to $\theta_4$ ($\theta_1<\theta_3<\theta_2<\theta_4$) a part of which overlaps the first range of $\theta_1$ to $\theta_2$. A lighting-off range of $\theta_5$ to $\theta_6$ is determined so as to satisfy a relation $\theta_3<\theta_5<\theta_6<\theta_4$. In a case in which one end of a shaded portion is to be moved toward a target position $\theta_{REF}$ ($>\theta_5$) from an initial position $\theta_{INIT}$ ($<\theta_3$), when the one end of the shaded portion reaches the lighting-off range, the non-scanning lamp is turned off.

Yet another embodiment of the present invention also relates to an automotive lamp. The automotive lamp includes: a scanning lamp structured to scan a beam in the horizontal direction in a first range of $\theta_1$ to $\theta_2$; and a non-scanning lamp structured to illuminate a second range of $\theta_3$ to $\theta_4$ ($\theta_1<\theta_3<\theta_2<\theta_4$) a part of which overlaps the first range of $\theta_1$ to $\theta_2$. A lighting-off range of $\theta_5$ to $\theta_6$ is determined so as to satisfy a relation $\theta_3<\theta_5<\theta_6<\theta_4$. In a case in which one end of a shaded portion is to be moved toward a target position $\theta_{REF}$ ($<\theta_3$) from an initial position $\theta_{INIT}$ ($>\theta_2$), when one end of the shaded portion deviates from the lighting-off range, the non-scanning lamp is turned on.

It should be noted that any combination of the components described above or any manifestation thereof may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiment 1

Outline of Embodiment 1

Figure 1A:
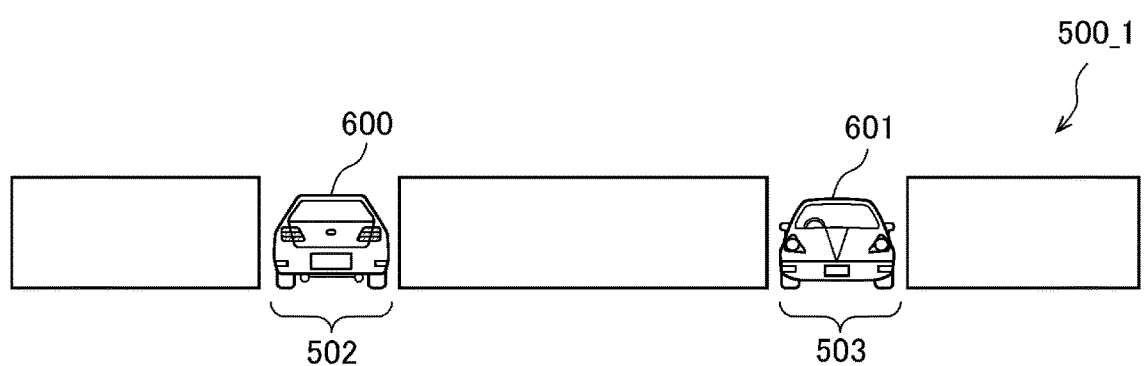
FIGS. 1A and 1B are diagrams for explaining transition of a light distribution pattern.
Figure 1B:
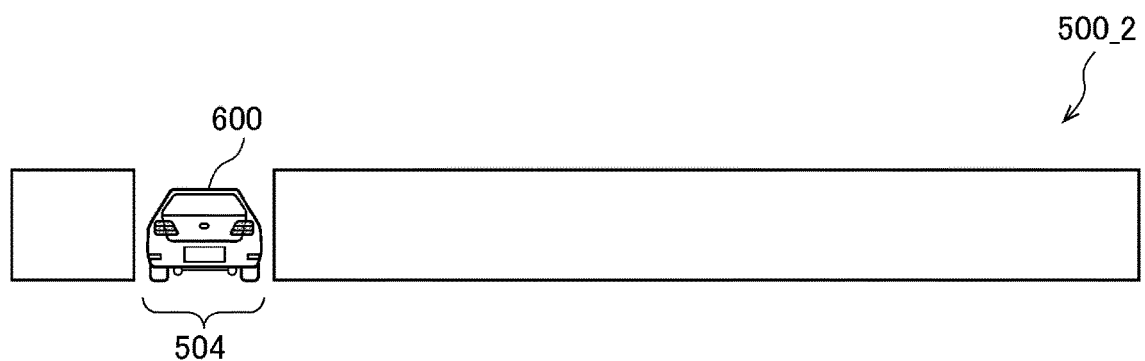

1. An embodiment of the present invention relates to an automotive lamp. The automotive lamp includes: a variable light distribution lamp; and a controller structured to control the variable light distribution lamp such that the variable light distribution lamp forms a light distribution pattern indicated by control data. When a first light distribution pattern is to be changed to a second light distribution pattern, and when a difference in the number of shaded portions between the first light distribution pattern and the second light distribution pattern is one, the controller switches a control method for gradually changing the light distribution pattern according to a position relation between the shaded portions included in the first light distribution pattern and the shaded portions included in the second light distribution pattern.

By switching the control method for gradually changing the light distribution pattern according to the position relation between the shaded portions, this is capable of reducing a sensation of discomfort.

In a case in which the first light distribution pattern before the transition includes a first shaded portion and a second shaded portion, and the second light distribution pattern includes a third shaded portion, i.e., in a case in which the number of the shaded portions decreases, the control is switched between the following four control methods.

(1) First Control Method

When both the first shaded portion and the second shaded portion are included in the same illuminated portion in the second light distribution pattern, a first control method is selected. In the first control method, one of the first shaded portion and the second shaded portion that is closer to the third shaded portion changes into the third shaded portion, and the other of the first shaded portion and the second shaded portion that is farther from the third shaded portion gradually disappears with time.

Also, the one that is farther from the third shaded portion is controlled such that both ends thereof move toward a center point thereof.

In the first control method, follow-up control is provided such that the shaded portions that exist at positions that are close to each other before and after transition correspond to each other. Furthermore, a shaded portion that exists at a distant position is controlled such that its width is reduced with time such that it disappears. This is capable of reducing a sensation of discomfort.

(Second Control Method)

When the first shaded portion and the second shaded portion are included in different illuminated portions in the second light distribution pattern, a second control method is selected. In the second control method, the left end of the first shaded portion moves toward the left end of the third shaded portion, the right end of the second shaded portion moves toward the right end of the third shaded portion, and the right end of the first shaded portion and the left end of the second shaded portion move toward a target position included in the third shaded portion.

Also, the target position may be a center of the third shaded portion.

(Third Control Method)

When one from among the first shaded portion and the second shaded portion overlaps the third shaded portion, and when the other from among the first shaded portion and the second shaded portion is included in an illuminated portion of the second light distribution pattern, a third control method is selected. In the third control method, the one from among the first shaded portion and the second shaded portion moves toward the third shaded portion, and the other from among the first shaded portion and the second shaded portion gradually disappears with time.

Also, both ends of the other of the first shaded portion and the second shaded portion may be moved toward a center point of the other.

In the third control method, follow-up control is provided such that the shaded portions that exist at positions that are close to each other before and after transition correspond to each other. Furthermore, a shaded portion that exists at a distant position is controlled such that its width is reduced with time such that it disappears. This is capable of reducing a sensation of discomfort.

(Fourth Control Method)

When both the first shaded portion and the second shaded portion overlap the third shaded portion, a fourth control method is selected. In the fourth control method, the left end of the first shaded portion moves toward the left end of the third shaded portion, the right end of the second shaded portion moves toward the right end of the third shaded portion, and the right end of the first shaded portion and the left end of the second shaded portion move toward a target position included in the third shaded portion. Also, the target position may be a center of the third shaded portion.

In a case in which the first light distribution pattern before transition includes a fourth shaded portion, and the second light distribution pattern before the transition includes a fifth shaded portion and a sixth shaded portion, i.e., in a case in which the number of the shaded portions increases, the control is switched between the following two control methods.

(Fifth Control Method)

When both the fifth shaded portion and the sixth shaded portion are included in the same illuminated portion of the first light distribution pattern, when the fifth shaded portion and the sixth shaded portion are respectively included in different illuminated portions of the first light distribution pattern, or when one from among the fifth shaded portion and the sixth shaded portion overlaps the fourth shaded portion, and when the other from among the fifth shaded portion and the sixth shaded portion is included in an illuminated portion of the first light distribution pattern, a fifth control method is selected. In the fifth control method, (i) the fourth shaded portion changes into one from among the fifth shaded portion and the sixth shaded portion that is closer to the fourth shaded portion, and (ii) from among the fifth shaded portion and the sixth shaded portion, one that is farther from the fourth shaded portion gradually appears with time.

For example, a slit having a narrow width may be generated at a center point of one from among the fifth shaded portion and the sixth shaded portion that is farther from the fourth shaded portion. Also, the slit may be controlled such that it spreads to the other from among them that is farther from the fourth shaded portion.

(Sixth Control Method)

When both the fifth shaded portion and the sixth shaded portion overlap the fourth shaded portion, a sixth control method is selected. In the sixth control method, the left end of the fourth shaded portion moves toward the left end of the fifth shaded portion, the right end of the fourth shaded portion moves toward the right end of the sixth shaded portion, and a new illuminated portion gradually appears with time such that it is interposed between the fifth shaded portion and the sixth shaded portion. For example, an illuminated portion having a narrow width may be generated as a seed at a center point of the new illuminated portion. Also, the seed may be controlled such that it changes into the new illuminated portion.

Specific Description of Embodiment 1

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

Figure 4:
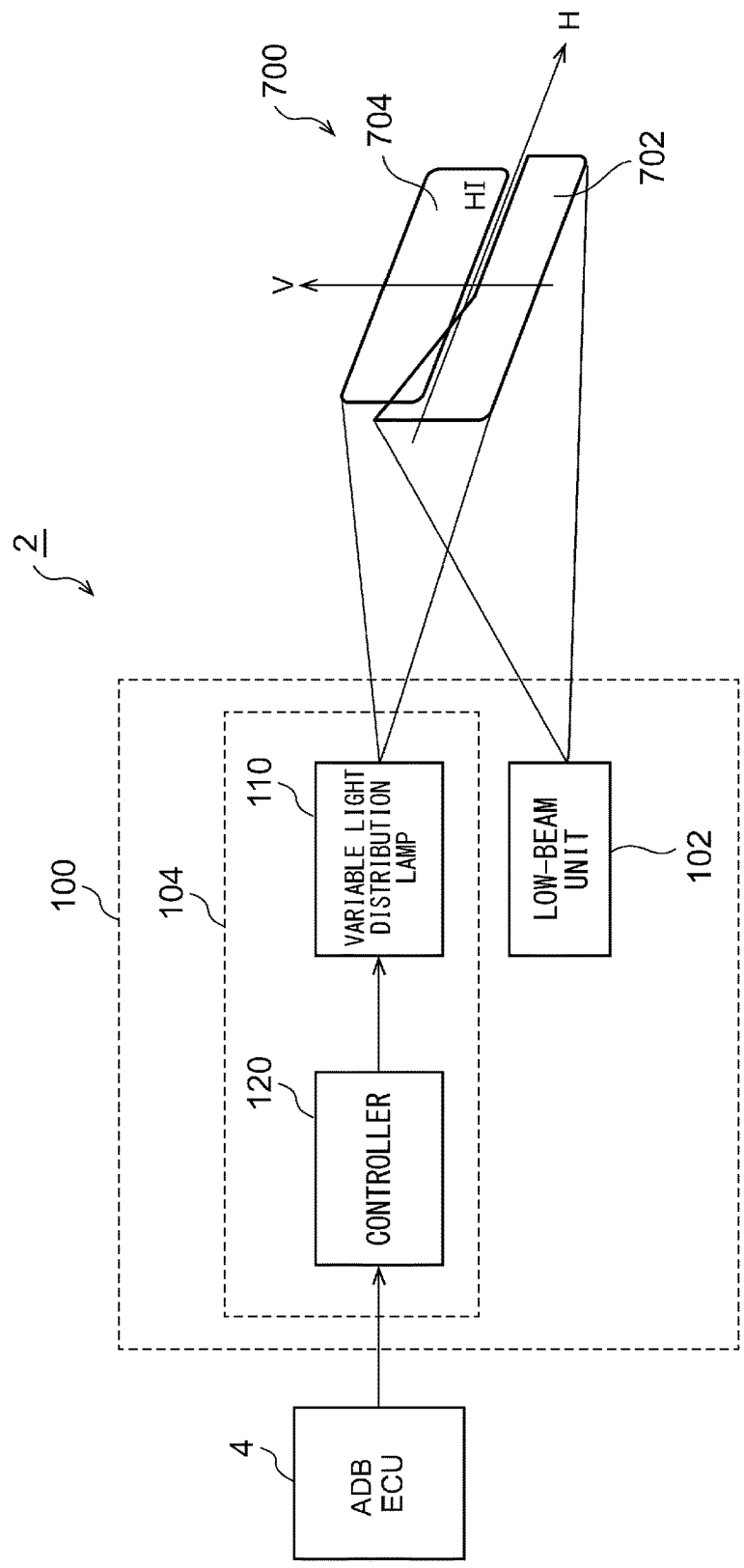
FIG. 4 is a block diagram showing a lamp system provided with an automotive lamp according to an embodiment 1.

FIG. 4 is a block diagram showing a lamp system 2 including an automotive lamp 100 according to an embodiment 1. The automotive lamp 100 receives control data for indicating a light distribution pattern from an ADB Electronic Control Unit (ECU) 4, and forms a light distribution pattern that corresponds to the control data in front of the vehicle. It should be noted that the ADB ECU 4 may be built into the automotive lamp 1.

The automotive lamp 100 includes a low-beam unit 102 and a high-beam unit 104. The low-beam unit 102 has a fixed light distribution pattern, and illuminates a predetermined region 702 on a virtual vertical screen 700.

The high-beam unit 104 supports an Adaptive Driving Beam (ADB) function. Specifically, the high-beam unit 104 is configured to adaptively control a light distribution pattern 704 according to the situation in front of the vehicle or the state of the user's vehicle itself. The high-beam unit 104 includes a variable light distribution lamp 110 and a controller 120.

The variable light distribution lamp 110 is configured to provide variable light distribution. The configuration of the variable light distribution lamp 110 is not restricted in particular. For example, the variable light distribution lamp 110 may be configured as a scanning-method lamp.

The controller 120 receives control data S1 for indicating the light distribution pattern from the ADB ECU 4. The controller 120 controls the variable light distribution lamp 110 so as to form the light distribution pattern indicated in front of the vehicle. The data format or signal format of the control data S1 is not restricted in particular.

The above is the basic configuration of the automotive lamp 100. Next, description will be made regarding the features of the light distribution control by the automotive lamp 100.

The control when the number of shading target objects changes from two to one, i.e., when the first light distribution pattern PTN1 including two shaded portions is changed to the second light distribution pattern PTN2 including a single shaded portion, will be explained.

When the first light distribution pattern including the first shaded portion and the second shaded portion is to be changed to the second light distribution pattern including the third shaded portion, the controller 120 switches a control method for gradually changing the light distribution pattern according to the position relation between the first shaded portion, the second shaded portion, and the third shaded portion.

In the present embodiment, the control method can be switched between four control methods according to the position relation.

(1) First Control Method

Figure 5A:
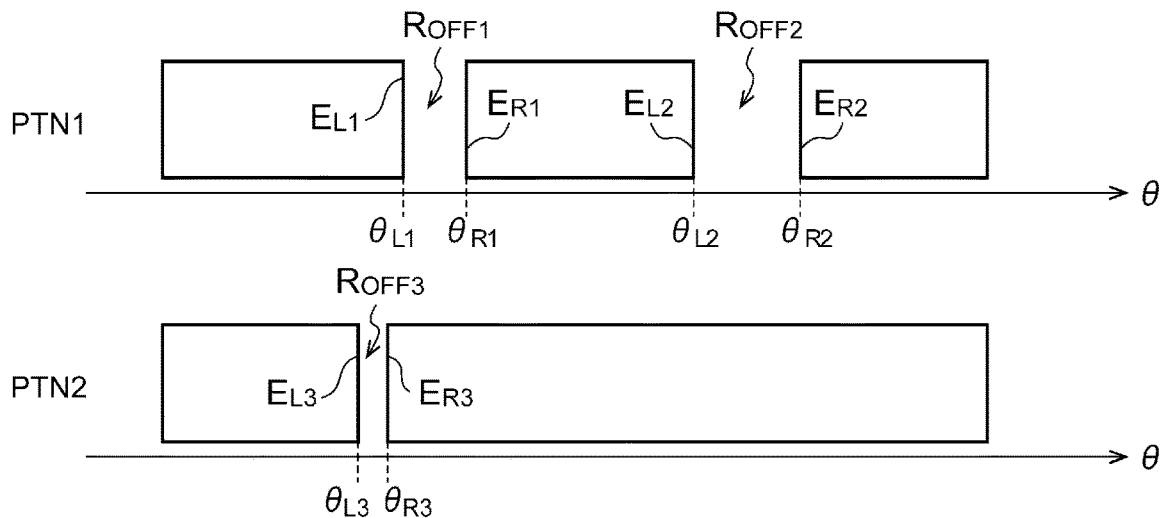
FIGS. 5A and 5B are diagrams for explaining a first control method.
Figure 5B:
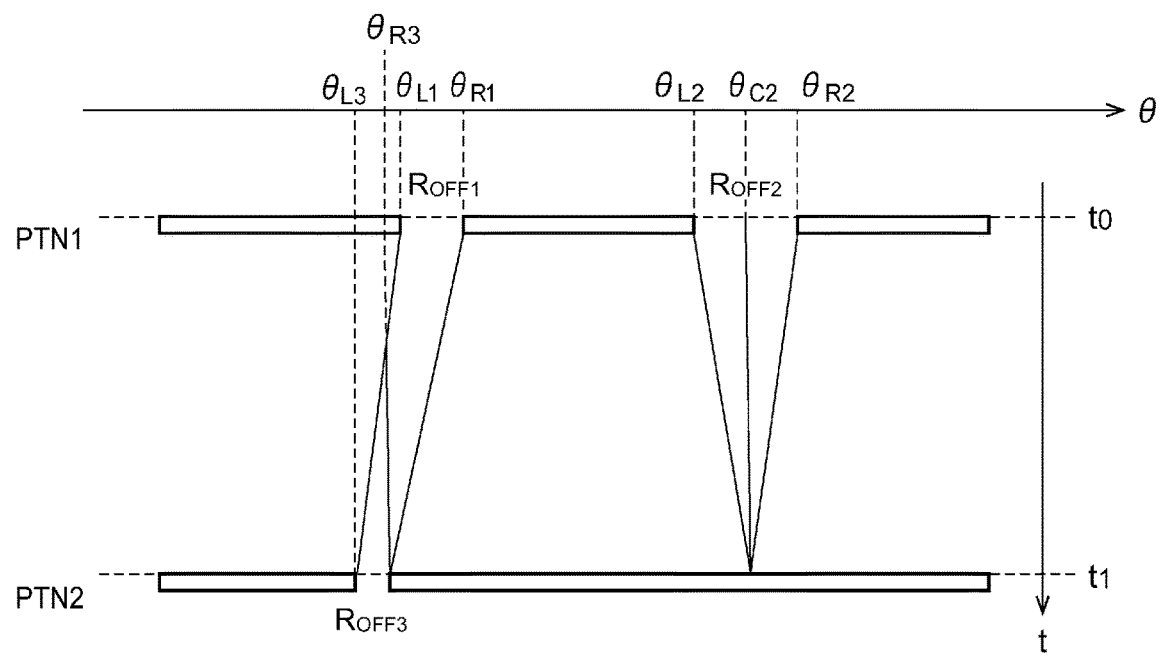

FIGS. 5A and 5B are diagrams for explaining the first control method. As shown in FIG. 5A, the first light distribution pattern PTN1 includes a first shaded portion $R_{OFF1}$ and a second shaded portion $R_{OFF2}$. The second light distribution pattern PTN2 includes a third shaded portion $R_{OFF3}$. In FIGS. 5A and 5B, the position in the horizontal direction is represented by the angle θ.

When both the first shaded portion $R_{OFF1}$ and the second shaded portion $R_{OFF2}$ are included in the same illuminated portion $R_{ON}$ of the second light distribution pattern PTN2, the first control method is selected.

The position of the left end $E_{L\#}$ of the shaded portion $R_{OFF\#}$ (if =1, 2, 3) will be represented by $θ_{L\#}$. The position of the right end $E_{R\#}$ thereof will be represented by $θ_{R\#}$.

In the first control method, from among the first shaded portion $R_{OFF1}$ and the second shaded portion $R_{OFF2}$, one that is closer to the third shaded portion $R_{OFF3}$ ($R_{OFF1}$ in this example) changes into the third shaded portion $R_{OFF3}$. Furthermore, from among the first shaded portion $R_{OFF1}$ and the second shaded portion $R_{OFF2}$ one that is farther than the third shaded portion $R_{OFF3}$ ($R_{OFF2}$ in this example) disappears with time.

FIG. 5B is a diagram showing the change of the light distribution pattern in the first control method. The horizontal axis represents the position of the edge (angular coordinate system), and the vertical axis represents time. At the time point $t_0$, an instruction for changing the light distribution pattern occurs. The left end ELI and the right end $E_{R1}$ of the first shaded portion $R_{OFF1}$ are moved toward the position $θ_{L3}$ of the left end $E_{L3}$ and the position $θ_{R3}$ of the right end $E_{R3}$ of the third shaded portion $R_{OFF3}$, respectively. At the time point $t_1$ after a transition time τ has elapsed from the time point $t_0$, the left end ELI and the right end $E_{R1}$ respectively reach the target positions $θ_{L3}$ and $θ_{R3}$ at the same time.

On the other hand, the left end $E_{L2}$ and the right end $E_{R2}$ of the second shaded portion $R_{OFF2}$ are moved toward the center point $θ_{C2}$ of the second shaded portion $R_{OFF2}$.

(2) Second Control Method

Figure 6A:
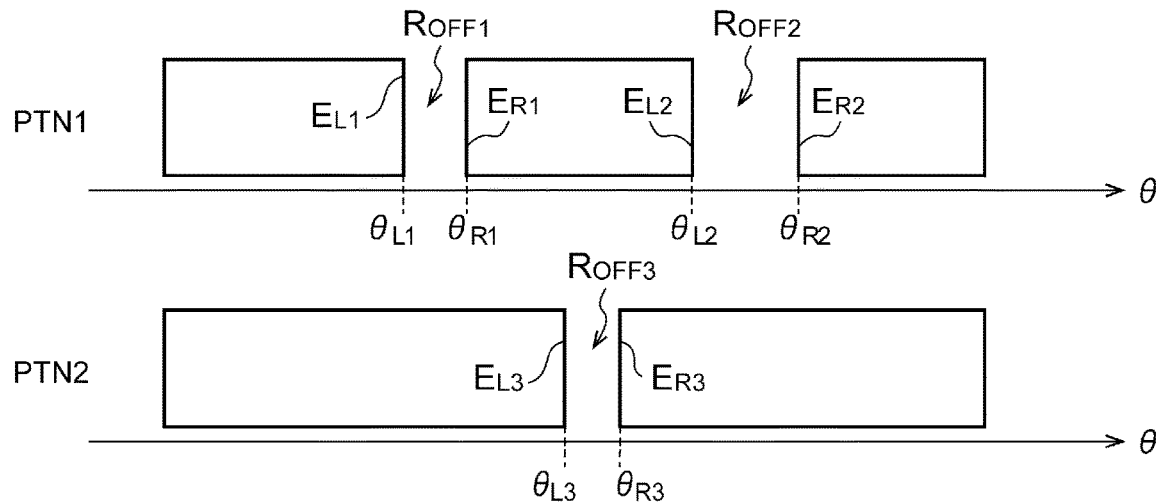
FIGS. 6A and 6B are diagrams for explaining a second control method.
Figure 6B:
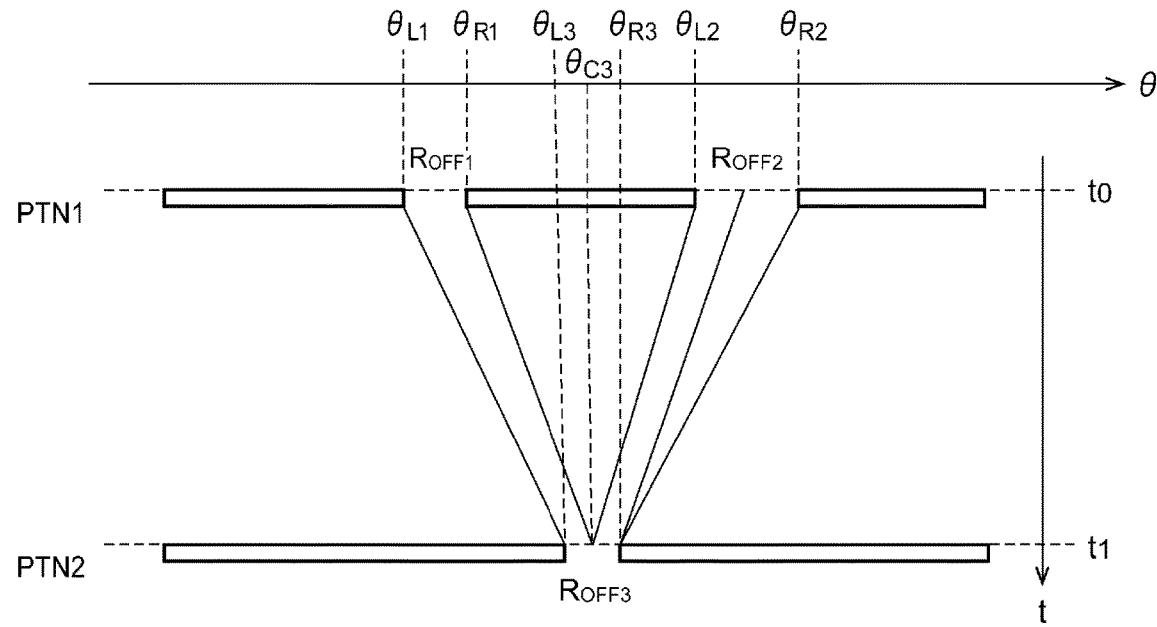

FIGS. 6A and 6B are diagrams for explaining the second control method. As shown in FIG. 6A, when the first shaded portion $R_{OFF1}$ and the second shaded portion $R_{OFF2}$ are included in different illuminated portions of the second light distribution pattern PTN2, the second control method is selected.

In the second control method, the left end ELI of the first shaded portion $R_{OFF1}$ is moved toward the left end $E_{L3}$ of the third shaded portion $R_{OFF3}$. Furthermore, the right end $E_{R2}$ of the second shaded portion $R_{OFF2}$ is moved toward the right end $E_{R3}$ of the third shaded portion $R_{OFF3}$. Moreover, the right end $E_{R1}$ of the first shaded portion $R_{OFF1}$ and the left end $E_{L2}$ of the second shaded portion $R_{OFF2}$ are moved toward a target position included in the third shaded portion $R_{OFF3}$. In this example the target position is set to the center of the third shaded portion $R_{OFF3}$.

FIG. 6B is a diagram showing the change of the light distribution pattern in the second control method. At the time point $t_0$, an instruction for changing the light distribution pattern occurs. The left end ELI of the first shaded portion $R_{OFF1}$ and the right end $E_{R2}$ of the second shaded portion $R_{OFF2}$ are moved toward the position $\theta_{L3}$ of the left end $E_{L3}$ and the position $\theta_{R3}$ of the right end $E_{R3}$ of the third shaded portion $R_{OFF3}$, respectively. Furthermore, the right end $E_{R1}$ of the first shaded portion $R_{OFF1}$ and the left end $E_{L2}$ of the second shaded portion $R_{OFF2}$ are each moved toward the target position represented by $\theta_{C3}=(\theta_{L3}+\theta_{R3})/2$.

(3) Third Control Method

Figure 7A:
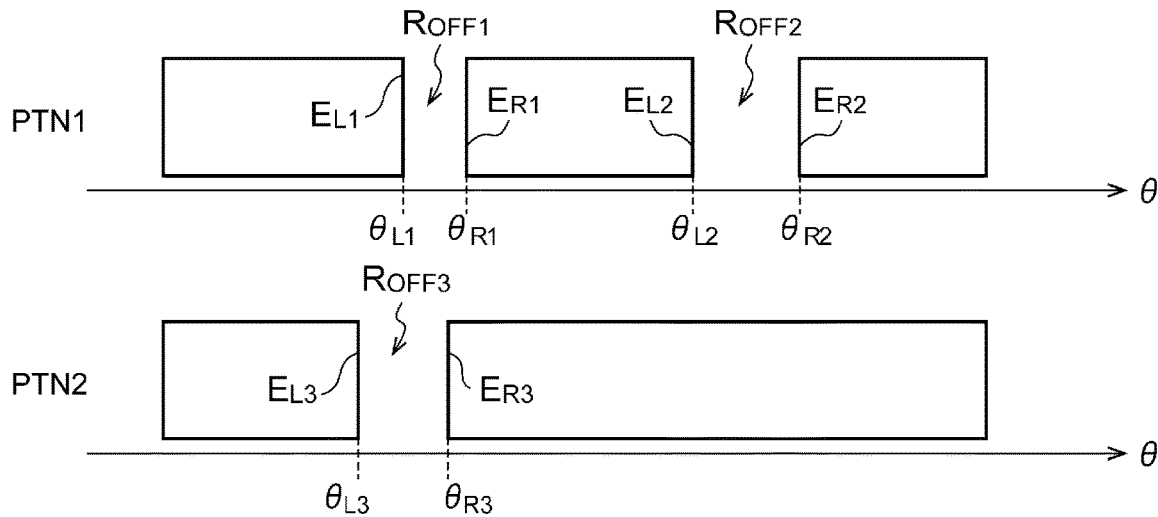
FIGS. 7A and 7B are diagrams for explaining a third control method.
Figure 7B:
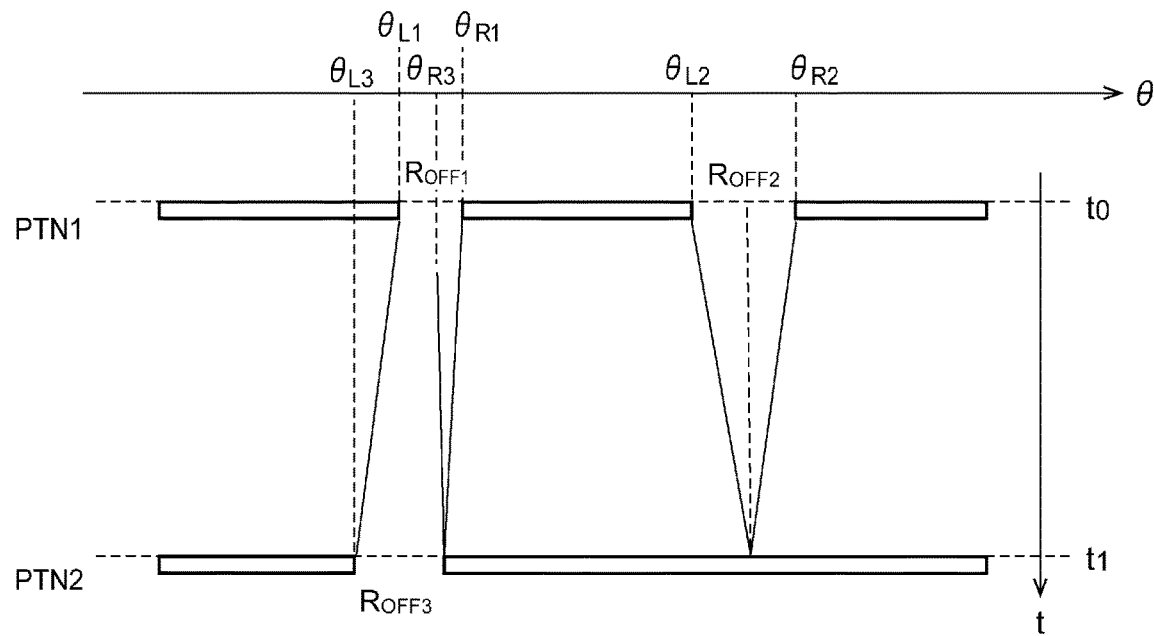

FIGS. 7A and 7B are diagrams for explaining the third control method. As shown in FIG. 7A, when one from among the first shaded portion $R_{OFF1}$ and the second shaded portion $R_{OFF2}$ ($R_{OFF1}$ in this example) overlaps the third shaded portion $R_{OFF3}$, and the other portion from among the first shaded portion $R_{OFF1}$ and the second shaded portion $R_{OFF2}$ ($R_{OFF2}$ in this example) is included in the illuminated portion of the second light distribution pattern PTN2, the third control method is selected.

In the third control method, one from among the first shaded portion $R_{OFF1}$ and the second shaded portion $R_{OFF2}$ ($R_{OFF1}$) changes into the third shaded portion $R_{OFF3}$. Furthermore, the other from among the first shaded portion $R_{OFF1}$ and the second shaded portion $R_{OFF2}$ ($R_{OFF2}$) disappears with time.

FIG. 7B is a diagram showing the change of the light distribution pattern in the third control method. The left end ELI and the right end $E_{R1}$ of the first shaded portion $R_{OFF1}$ are moved toward the position $\theta_{L3}$ of the left end $E_{L3}$ and the position $\theta_{R3}$ of the right end $E_{R3}$ of the third shaded portion $R_{OFF3}$, respectively. On the other hand, the left end $E_{L2}$ and the right end $E_{R2}$ of the second shaded portion $R_{OFF2}$ are each moved toward the center point $\theta_{C2}$ of the second shaded portion $R_{OFF2}$.

(4) Fourth Control Method

Figure 8A:
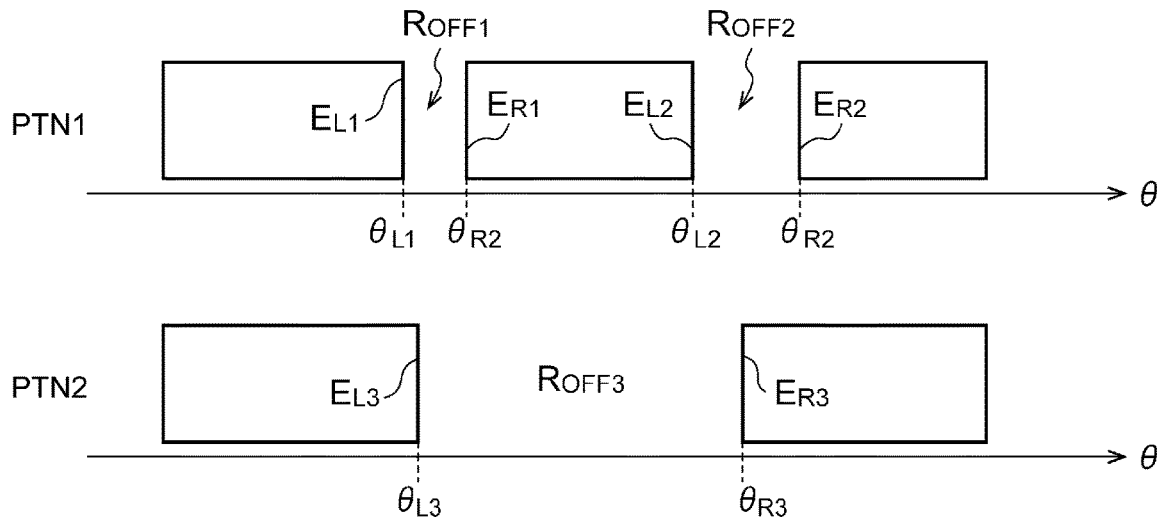
FIGS. 8A and 8B are diagrams for explaining a fourth control method.
Figure 8B:
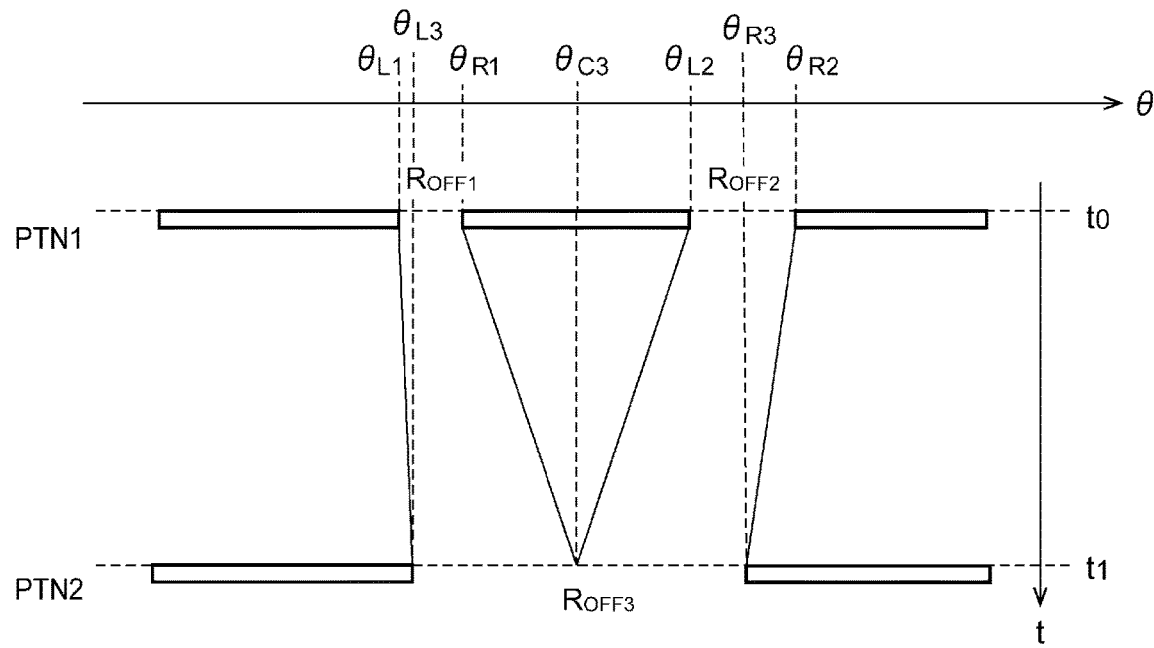

FIGS. 8A and 8B are diagrams for explaining the fourth control method. As shown in FIG. 8A, when both the first shaded portion $R_{OFF1}$ and the second shaded portion $R_{OFF2}$ overlap the third shaded portion $R_{OFF3}$, the fourth control method is selected. In the fourth control method, the left end ELI of the first shaded portion $R_{OFF1}$ is moved toward the left end $E_{L3}$ of the third shaded portion $R_{OFF3}$, and the right end $E_{R2}$ of the second shaded portion $R_{OFF2}$ is moved toward the right end $E_{R3}$ of the third shaded portion $R_{OFF3}$. Furthermore, the right end $E_{R1}$ of the first shaded portion $R_{OFF1}$ and the left end $E_{L2}$ of the second shaded portion $R_{OFF2}$ are each moved toward a target position included in the third shaded portion $R_{OFF3}$. The target position is provided in the center of the third shaded portion $R_{OFF3}$.

FIG. 8B is a diagram showing the change of the light distribution pattern in the fourth control method. At the time point $t_0$, an instruction for changing the light distribution pattern occurs. The left end ELI of the first shaded portion $R_{OFF1}$ and the right end $E_{R2}$ of the second shaded portion $R_{OFF2}$ are moved toward the position $\theta_{L3}$ of the left end $E_{L3}$ and the position $\theta_{R3}$ of the right end $E_{R3}$ of the third shaded portion $R_{OFF3}$, respectively. Furthermore, the right end $E_{R1}$ of the first shaded portion $R_{OFF1}$ and the left end $E_{L2}$ of the second shaded portion $R_{OFF2}$ are each moved to the target position represented by $\theta_{C3}=(\theta_{L3}+\theta_{R3})/2$.

Next, description will be made regarding a control operation when the number of target objects to be shaded changes from one to two, i.e., when the first light distribution pattern PTN1 including a single shaded portion is switched to the second light distribution pattern PTN2 including two shaded portions.

When the first light distribution pattern including a fourth shaded portion is switched to the second light distribution pattern including a fifth shaded portion and a sixth shaded portion, the controller 120 switches a control method for gradually changing the light distribution pattern according to the position relation between the fourth shaded portion, the fifth shaded portion, and the sixth shaded portion.

With the present embodiment, two control methods are switchable according to the position relation.

(Fifth Control Method)

Figure 9A:
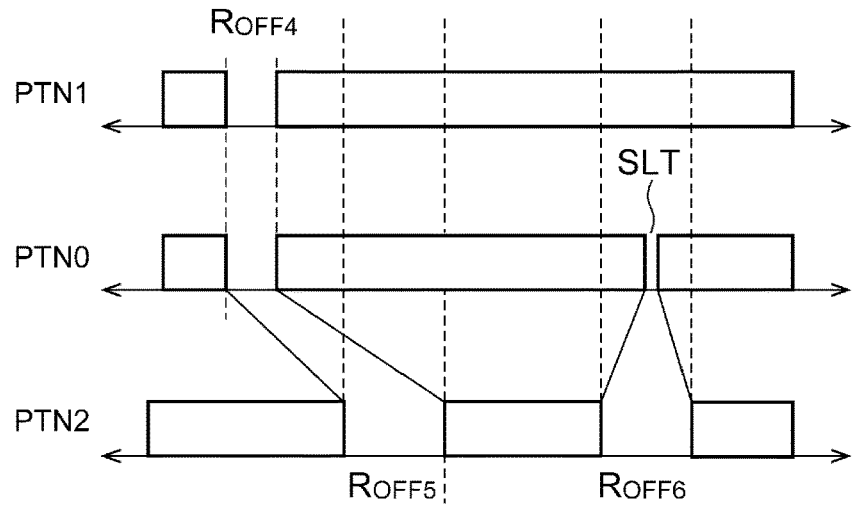
FIGS. 9A through 9C are diagrams for explaining a fifth control method.
Figure 9B:
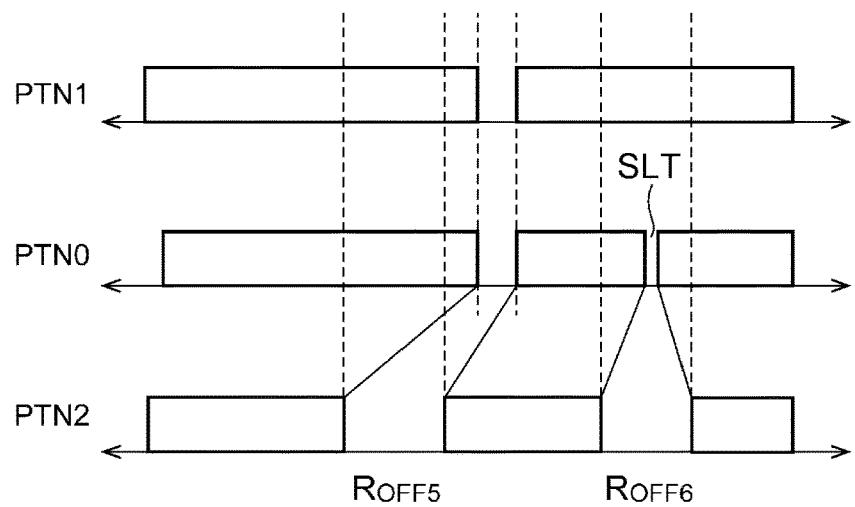
Figure 9C:
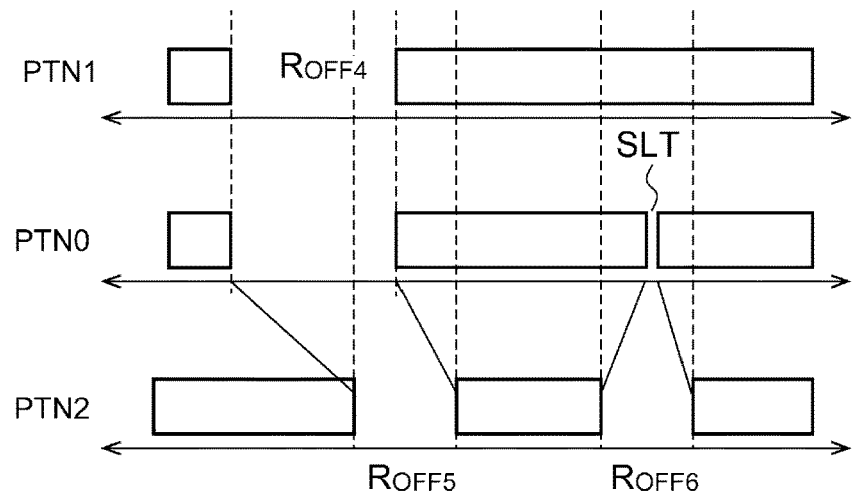

FIGS. 9A through 9C are diagrams for explaining the fifth control method. When both the fifth shaded portion $R_{OFF5}$ and the sixth shaded portion $R_{OFF6}$ are included in the same illuminated portion of the first light distribution pattern PTN1 as shown in FIG. 9A, when the fifth shaded portion $R_{OFF5}$ and the sixth shaded portion $R_{OFF6}$ are respectively included in different illuminated portions of the first light distribution pattern PTN1 as shown in FIG. 9B, or when one from among the fifth shaded portion $R_{OFF5}$ and the sixth shaded portion $R_{OFF6}$ ($R_{OFF5}$ in this example) overlaps the fourth shaded portion $R_{OFF4}$ and the other ($R_{OFF6}$ in this example) is included in the illuminated portion of the first light distribution pattern PTN1 as shown in FIG. 9C, the fifth control method is selected. In the fifth control method, (i) from among the fifth shaded portion $R_{OFF5}$ and the sixth shaded portion $R_{OFF6}$, the fourth shaded portion $R_{OFF4}$ changes into the one that is closer to the fourth shaded portion $R_{OFF4}$ ($R_{OFF5}$ in this example). (ii) Furthermore, from among the fifth shaded portion $R_{OFF5}$ and the sixth shaded portion $R_{OFF6}$, the other, i.e., $R_{OFF6}$, which is farther from the fourth shaded portion $R_{OFF4}$, gradually appears with time. For example, a slit SLT having a narrow width may be generated at the center point of the other portion $R_{OFF6}$ that is farther from the fourth shaded portion $R_{OFF4}$. Also, the slit SLT may be controlled such that it spreads to the sixth shaded portion $R_{OFF6}$. Specifically, an initial pattern PTN0 including the slit SLT may be generated. Also, the initial pattern PTN0 may be controlled such that it gradually transits toward the second light distribution pattern PTN2 from the initial pattern PTN0.

(Sixth Control Method)

Figure 10:
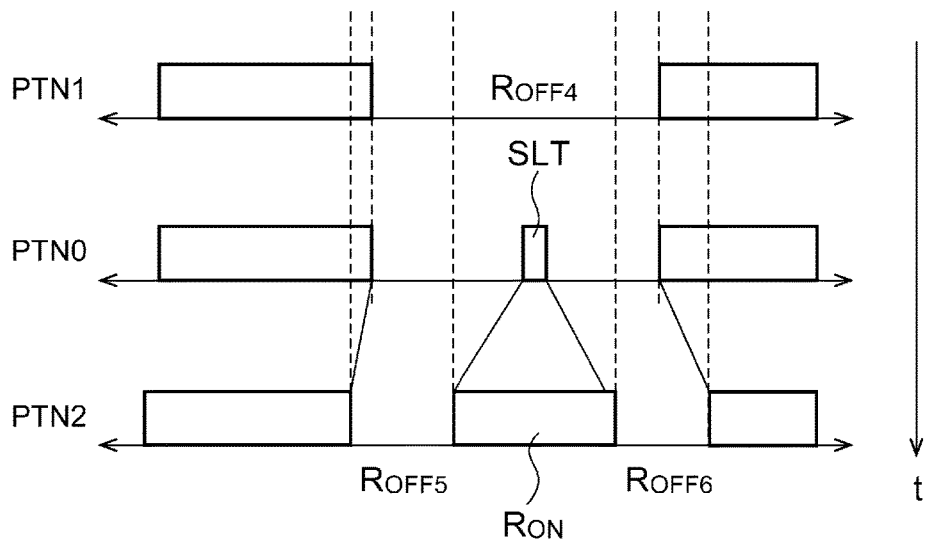
FIG. 10 is a diagram for explaining a sixth control method.

FIG. 10 is a diagram for explaining the sixth control method. As shown in FIG. 10, when both the fifth shaded portion $R_{OFF5}$ and the sixth shaded portion $R_{OFF6}$ overlap the fourth shaded portion $R_{OFF4}$, the sixth control method is selected. In the sixth control method, the left end of the fourth shaded portion $R_{OFF4}$ is moved toward the left end of the fifth shaded portion $R_{OFF5}$, and the right end of the fourth shaded portion $R_{OFF4}$ is moved toward the right end of the sixth shaded portion $R_{OFF6}$. Furthermore, a new illuminated portion $R_{ON}$ gradually appears with time such that it is interposed between the fifth shaded portion $R_{OFF5}$ and the sixth shaded portion $R_{OFF6}$. For example, a narrow illuminated portion may be generated as a seed having a narrow width at the center of the new illuminated portion $R_{ON}$. Also, the seed SEED may be controlled such that it changes into the new illuminated portion $R_{ON}$. Specifically, an initial pattern PTN0 including the seed SEED may be generated. Also, the seed SEED may be controlled such that it gradually changes into the initial pattern PTN0 toward the second light distribution pattern PTN2.

The above is the operation of the automotive lamp 100.

With the automotive lamp 100, the gradual change control method is switched according to the position relation between the shaded portions, thereby reducing a sensation of discomfort.

In particular, with the first control method or the third control method, follow-up control is provided such that the shaded portions that exist at positions that are close to each other before and after a transition correspond to each other. This provides the transition with a reduced sensation of discomfort. Furthermore, when there is no shaded portion that corresponds to a shaded portion that exists after a transition, the illumination is gradually turned off at this position, thereby providing the transition with a reduced sensation of discomfort.

Furthermore, the illumination is gradually turned off toward the illuminated portion before a transition or toward the shaded portion after a transition. This prevents visual guidance, thereby providing the transition with a reduced sensation of discomfort.

Furthermore, when the number of the shaded portions is increased, the fifth control method and the sixth control method are switched so as to prevent visual guidance, thereby providing the transition with a reduced sensation of discomfort.

Figure 11:
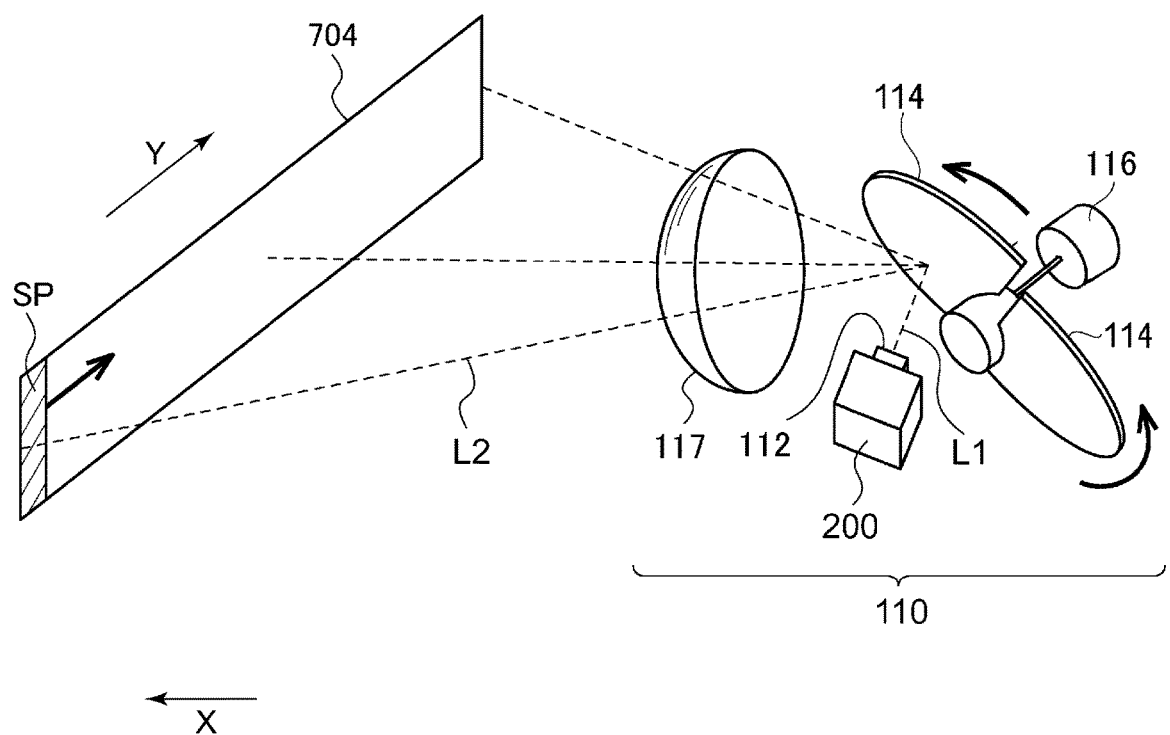
FIG. 11 is a perspective diagram showing an automotive lamp according to an embodiment 1.

Next, description will be made regarding an example configuration of the variable light distribution lamp 110. FIG. 11 is a perspective diagram showing an automotive lamp 1 according to an embodiment 1. The automotive lamp 1 shown in FIG. 11 includes the variable light distribution lamp 110 employing a blade scanning method, thereby forming various kinds of light distribution patterns in front of the vehicle. The variable light distribution lamp 110 includes a light source 112, a reflector 114, a projection lens 117, and a lighting circuit 200. Also, multiple light sources 112 may be provided as described later. However, for ease of understanding and for simplification of explanation, description will be made regarding an arrangement including a single light source 112.

The light source 112 is configured as a semiconductor light source employing a light-emitting diode (LED) or laser diode. The reflector 114 receives output light $L_1$ from the light source 112, and repeats predetermined periodic motion so as to scan reflected light $L_2$ thereof in the horizontal direction (Y direction in the drawing) in front of the vehicle. The reflector 114 is attached to a rotor of a motor 116 so as to provide rotational motion. At a given time point, the output light $L_1$ incident to the reflector 114 is reflected at a reflection angle that corresponds to the position of the reflector 114 (rotational angle of the rotor), thereby forming an illumination spot SP.

The reflector 114 is rotated so as to change the reflection angle such that the illumination spot SP is scanned in the Y direction. This operation is repeated at a high speed, e.g., at 50 Hz or more, thereby forming the light distribution pattern 704 in front of the vehicle. For example, in a case in which the motor is rotated at a rotational speed of 6000 rpm, the illumination spot SP is scanned at 200 Hz, i.e., with a scanning period of 5 ms.

The lighting circuit 200 controls the light amount (luminance) of the light source 112 in synchronization with the periodic motion of the reflector 114 so as to provide a desired light distribution pattern. A region (range) to which the illumination spot SP is irradiated will be referred to as the "illuminated portion" $R_{ON}$. Conversely, a region (range) to which the illumination spot SP is not irradiated will be referred to as the "shaded portion" $R_{OFF}$. The light distribution pattern 704 is configured as a combination of the illuminated portions $R_{ON}$ and the shaded portions $R_{OFF}$.

Figure 12:
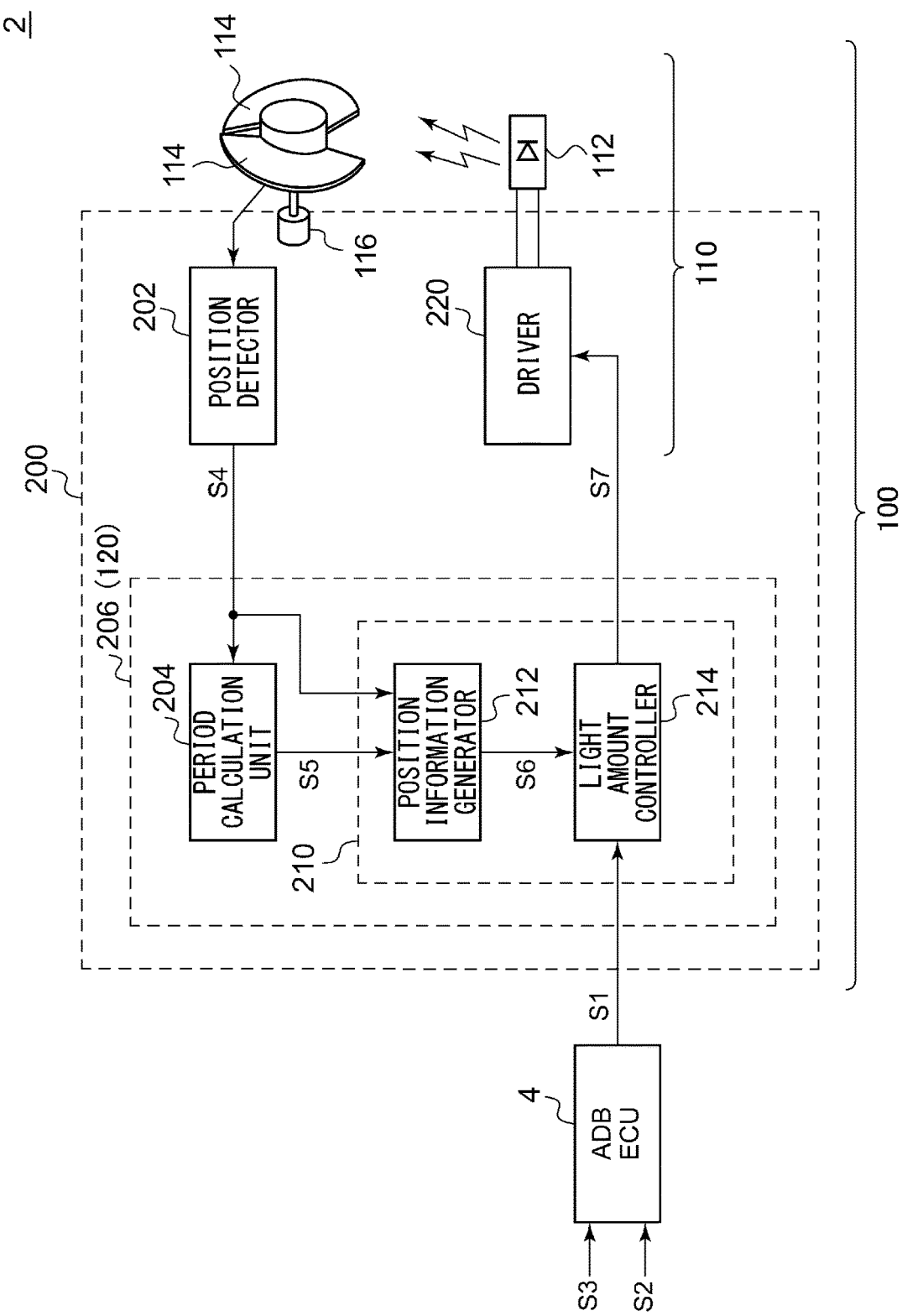
FIG. 12 is a circuit diagram showing an example configuration of a lighting circuit.

FIG. 12 is a circuit diagram showing an example configuration of the lighting circuit 200. The ADB ECU 4 receives the camera information S3 and the vehicle information S2. The ADB ECU 4 detects the situation in front of the vehicle, and specifically, detects the positions of target objects such as an oncoming vehicle, leading vehicle, pedestrian, etc., based on the camera information S3. Furthermore, the ADB ECU 4 detects the current vehicle speed, steering angle, etc., based on the vehicle information S2. The ADB ECU 4 determines the light distribution pattern to be irradiated in front of the vehicle based on such information, and transmits the control data S1 for indicating the light distribution pattern to the automotive lamp 1. For example, the control data S1 may be described such that the irradiation coordinate in the horizontal direction is represented by an angle, and such that it includes coordinate information (angle information) for indicating a boundary between the illuminated portion $R_{ON}$ and the shaded portion $R_{OFF}$.

For example, for ease of understanding, description will be made assuming that the light amount of the light source 112 is controlled such that it is switched between only the on state and the off state. In this case, the control data S1 may include data for indicating the shaded portions $R_{OFF}$ of the light distribution pattern 704 to be formed in front of the vehicle. For example, the control data S1 may include a set of the coordinate $\theta_L$ that indicates the left end of the shaded portion $R_{OFF}$ and the coordinate OR that indicates the right end thereof. In a case in which there are multiple shaded portions $R_{OFF}$, the control data S1 may include multiple sets of coordinates $(\theta_L, \theta_R)$. Alternatively, the control data S1 may include a set of the coordinate $\theta_C$ of the center of the shaded portion $R_{OFF}$ and the width A thereof. Also, the control data S1 may include a set of the coordinate $\theta_L$ of the left end (or coordinate OR of the right end) of the shaded portion $R_{OFF}$ and the width A thereof.

Conversely, instead of the data for indicating the shaded portions $R_{OFF}$, the control data S1 may include data for indicating the illuminated portions $R_{ON}$. Also, the control data S1 may include both.

The lighting circuit 200 controls the light amount (luminance) of the light source 112 based on the control data S1 in synchronization with the rotation of the reflector 114. The lighting circuit 200 includes a position detector 202, a period calculation unit 204, a light amount calculation unit 210, and a driver 220. A combination of the period calculation unit 204 and the light amount calculation unit 210 will be referred to as a "lamp ECU 206". The lamp ECU 206 may be configured employing a microcontroller, microprocessor, or an Application Specified IC (ASIC). The lamp ECU 206 corresponds to the controller 120 shown in FIG. 5.

The position detector 202 generates a position detection signal S4 that indicates a timing at which a predetermined reference portion of the reflector 114 passes a predetermined position. For example, the reference portion may be defined by the ends of the two reflectors 114 (a gap between them). Also, the reference portion may be defined by the center of each blade. That is to say, a desired position may be used as the reference portion.

A Hall element may be mounted on the motor 116 that rotates the reflector 114. In this case, a Hall signal output from the Hall element has a periodic waveform that corresponds to the rotor position, i.e., the blade position (which will be referred to as a "blade coordinate" hereafter). The position detector 202 may detect a timing at which the polarity of the Hall signal is inverted. Specifically, the position detector 202 may be configured as a Hall comparator that compares a pair of Hall signals.

The period calculation unit 204 calculates the period Tp of the periodic motion of the blade based on the position detection signal S4 output from the position detector 202. For example, in a case in which the position detection signal S4 is an output of a Hall comparator, the period calculation unit 204 measures the period (half period) of the edge of the position detection signal S4. The period calculation unit 204 may be configured as a counter that counts the edge interval using a clock signal. The period calculation unit 204 outputs period information S5 that indicates the measured period.

The light amount calculation unit 210 receives the control data S1, and calculates the light amount to be generated by the light source 112 at each time based on the position detection signal S4 and the period Tp indicated by the period information S5.

For example, the light amount calculation unit 210 is configured as a microcontroller, microprocessor, Digital Signal Processor (DSP), Central Processing Unit (CPU), Application Specified IC (ASIC), or the like, and includes function blocks which will be referred to as a position information generator 212 and a light amount controller 214.

The position information generator 212 generates position information S6 that indicates the position of the reflector 114 at each time point based on the period information S5 and the position detection signal S4. For example, the position information generator 212 may be configured as a counter that is reset at each edge of the position detection signal S4, and that counts up (or counts down) at each unit time obtained by dividing the period Tp by N (N represents an integer).

Based on the control data S1 and the position information S6, the light amount controller 214 calculates the target light amount (on state and off state) of the light source 112 at each time point, and generates a light amount instruction value S7 that indicates the target light amount.

The correspondence relation between the blade coordinate X (i.e., position information S6) and the irradiation coordinate $\theta$ can be derived based on the geometric arrangement relation between the light source 112 and the reflector 114. The light amount controller 214 may include a table that holds the correspondence relation between the position information S6 and the irradiation coordinate $\theta$. Also, the light amount controller 214 may hold a calculation expression that describes the correspondence relation between them.

The light amount controller 214 may convert the data $\theta_L$ and $\theta_R$ described by the irradiation coordinate $\theta$ included in the control data S1 into the data $X_L$ and $X_R$ that represent the blade coordinates, so as to determine the light amount at each time point. Alternatively, the light amount controller 214 may convert the blade coordinate X indicated by the position information S6 into the irradiation coordinate $\theta$ so as to determine the light amount at each time point.

When the period Tp is longer than a predetermined threshold value, i.e., when the rotational speed of the motor 116 is slow, the light amount calculation unit 210 preferably turns off the light source 112. In a case in which the light source 112 is turned on when the period Tp of the motion of the reflector 114 is long, this leads to the driver perceiving flickering (which will also be referred to as "flicker"). Accordingly, with such an arrangement in which the light source 112 is turned off in such a situation, this is capable of preventing discomfort.

For example, when the scanning frequency of the illumination spot SP is equal to or smaller than 50 Hz, the light source 112 may be turned off. It is empirically known that, when the scanning frequency becomes lower than 50 Hz, this leads to flicker being perceived by the human eye. It can be said that, in a case in which a pair of reflectors 114 are employed, when the rotational speed of the motor 116 is equal to or higher than 1500 rpm, this involves no perception of flicker.

The driver 220 receives a light amount instruction value S7, and instructs the light source 112 to turn on so as to provide the light amount calculated by the light amount calculation unit 210 at each time point.

The above is the configuration of the lighting circuit 200 and the automotive lamp 1 provided with the lighting circuit 200. Next, description will be made regarding the operation thereof.

Figure 13:
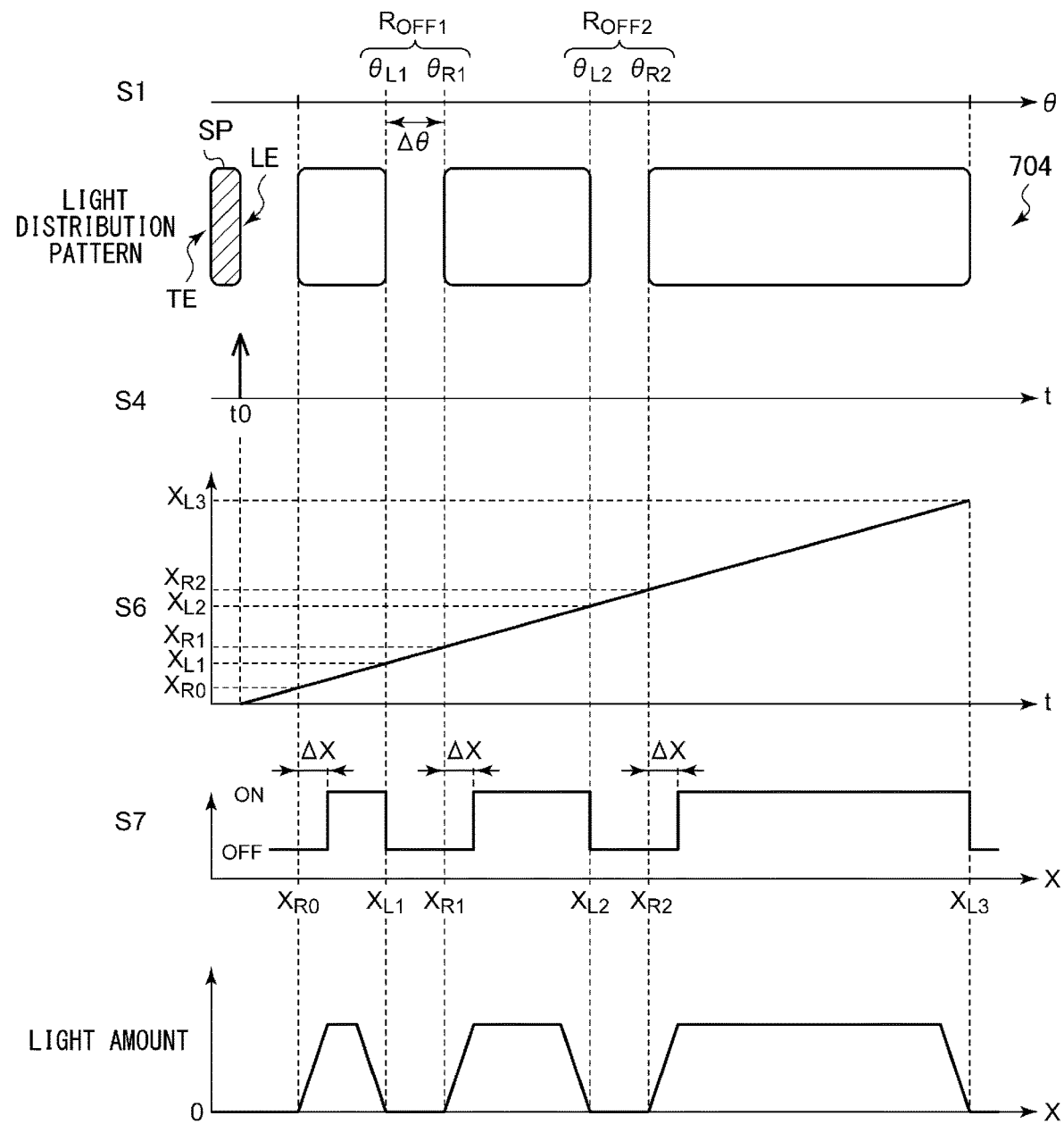
FIG. 13 is a diagram for explaining the operation of the lighting circuit shown in FIG. 12.

FIG. 13 is a diagram for explaining the operation of the lighting circuit 200 shown in FIG. 12. The horizontal axis can represent the irradiation coordinate $\theta$, blade coordinate X, and time t, which can be associated with each other in a one-to-one manner. Here, the drawing shows an example for generating two shaded portions $R_{OFF1}$ and $R_{OFF2}$.

The illumination spot SP indicates a portion to be illuminated by the single light source 112 when the reflector 114 is stopped at a predetermined position. As the reflector 114 rotates with time, the illumination spot SP is scanned in a direction in which the irradiation coordinates become larger (or in the opposite direction). A side of the illumination spot SP in the scanning direction will be referred to as a "leading edge LE". A side on the opposite side will be referred to as a "trailing edge TE". Description will be made in the present embodiment assuming that the light amount is controlled with the coordinate of the leading edge LE as a reference.

The motor 116 that positions the reflector 114 is rotated at a predetermined rotational speed. For example, the motor 116 is rotated at 6000 rpm. It should be noted that the rotational speed of the motor 116 cannot be maintained to be completely constant. Furthermore, the motor 116 is not rotated under the control of the lamp ECU 206. That is to say, the motor 116 rotates in a free-run state. Accordingly, the lamp ECU 206 adaptively controls the light source 112 according to the state of the motor 116 (reflector 114).

When the position detection signal S4 is asserted at a given time point $t_0$, this time is associated with the reference value (e.g., 0) of the blade coordinate X. Subsequently, the value of the position information S4 that indicates the position of the blade is increased with time. That is to say, this provides a one-to-one correspondence between the time t and the position information S6. The slope is determined from the period Tp of the position detection signal S4 calculated in an immediately previous step.

The left-end coordinate $\theta_L$ and the right-end coordinate $\theta_R$ of each of the shaded portions $R_{OFF1}$ and $R_{OFF2}$ are converted into data $X_L$ and $X_R$ of the blade coordinate X, respectively. Furthermore, the light amount controller 214 generates the light amount instruction value S7 such that the light amount becomes zero in the shaded portions $R_{OFF1}$ and $R_{OFF2}$.

As shown in FIG. 13, the timing at which the light amount instruction value S7 is switched from the off state to the on state has an offset of $\Delta X$ with respect to the range of the shaded portion. Here, $\Delta X$ represents the width of the illumination spot SP. Description will be made regarding the reason for this. In the blade scanning method, the illumination spot SP is scanned so as to form a light distribution pattern. With this, the light distribution pattern 704 is represented by the integrated value of the illumination spot SP. Accordingly, if the illumination spot SP is switched from the on state to the off state with the coordinate of the leading edge LE as a reference, this leads to a problem in that light is irradiated to the shaded portion $R_{OFF}$. In order to solve such a problem, when the coordinate of the leading edge LE reaches the beginning of the shaded portion (end of the illuminated portion) $X_L$, the light amount controller 214 switches the light source 112 from the on state to the off state. Furthermore, when the coordinate of the trailing edge TE reaches the end of the shaded portion (beginning of the illuminated portion) $X_R$, i.e., when the coordinate of the leading edge LE becomes $(X_R+\Delta X)$, the light amount controller 214 preferably switches the light source 112 from the off state to the on state. This allows the shaded portion $R_{OFF}$ to become dark.

The above is the operation of the lighting circuit 200. With the lighting circuit 200, even in a case in which the periodic motion of the reflector 114 is not under the control of the lighting circuit 200, this is capable of estimating the position of the reflector 114 at each time point based on the period Tp of the reflector 114 and the position detection signal S4. With this, the position of the illumination spot SP of the reflected light can be estimated based on the estimated position of the reflector 114. Accordingly, such an arrangement is capable of changing the light amount of the light source 112 with time according to the change in the position of the reflector 114, thereby allowing a desired light distribution pattern to be formed.

Description will be made regarding a modification relating to the embodiment 1.

First Modification

In the first control method or the third control method, a method for causing the disappearance of the second shaded portion $R_{OFF2}$ is not restricted to the method shown in FIG. 5. For example, the second portion $R_{OFF2}$ may be controlled such that one end is fixed and the other end approaches the fixed end. The same can be same of the third control method.

Alternatively, an additional illuminated portion configured as a seed may be generated at the center of the second shaded portion $R_{OFF2}$. Also, the width of the additional illuminated portion may be increased with time.

Second Modification

Description has been made in the embodiment regarding an arrangement in which the light distribution pattern is formed using the single illumination spot SP that corresponds to the single light source 112. However, the present invention is not restricted to such an arrangement. Also, multiple light sources 112 may be provided. Also, a light distribution pattern may be formed using a combination of the illuminated portions respectively formed by the multiple illumination spots SP.

Third Modification

Description has been made in the embodiment regarding the variable light distribution lamp 110 employing the scanning method. However, the present invention is not restricted to such an arrangement. For example, the variable light distribution lamp 110 may include a patterning device such as a Digital Micromirror Device (DMD), a liquid crystal, or the like. Alternatively, the variable light distribution lamp 110 may include an array of light-emitting elements that are capable of turning on and off independently. In particular, as an array of light-emitting elements (LEDs) having a high resolution, a commercially available product known as a micro-LED may be employed.

Fourth Modification

Description has been made regarding an arrangement employing a pair of reflectors 114. However, the number of reflectors is not restricted. Also, only a single reflector may be employed. Also, three or more reflectors may be employed. Description has been made in the embodiment regarding an arrangement in which the reflectors 114 are rotationally driven. Also, the reflectors 114 may be reciprocally driven.

Embodiment 2

Outline of Embodiment 2

An automotive lamp according to an embodiment includes: a scanning lamp structured to scan a beam in the horizontal direction in a first range of $\theta_1$ to $\theta_2$; and a non-scanning lamp structured to illuminate a second range of $\theta_3$ to $\theta_4$ ($\theta_1<\theta_3<\theta_2<\theta_4$) a part of which overlaps the first range of $\theta_1$ to $\theta_2$. A lighting-off range of $\theta_5$ to $\theta_6$ is determined so as to satisfy a relation $\theta_3<\theta_5<\theta_6<\theta_4$. In a case in which one end of a shaded portion is to be moved toward a target position $\theta_{REF}$ ($>\theta_5$) from an initial position $\theta_{INIT}$ ($<\theta_3$), when the one end of the shaded portion reaches the lighting-off range of $\theta_5$ to $\theta_6$, the non-scanning lamp is turned off.

With this arrangement, the non-scanning region that originally overlapped with the illuminated portion is turned off after this illuminated portion has been turned off. This prevents the illuminated portion from remaining, thereby reducing a sensation of discomfort imparted to the driver.

Also, the non-scanning lamp may be structured to be gradually turned off with time.

Also, the non-scanning lamp may be structured such that, in a case in which the one end of the shaded portion is moved toward a target position $\theta_{REF}$ ($<\theta_3$) from an initial position $\theta_{INIT}$ ($>\theta_2$), when one end position $\theta_X$ of the shaded portion deviates from the lighting-off range of $\theta_5$ to $\theta_6$, the non-scanning lamp is turned on. This control provides improved coordination between the non-scanning region illuminated by the non-scanning lamp and the scanning region illuminated by the scanning lamp.

Also, the non-scanning lamp may be structured to be gradually turned on with time. This prevents the occurrence of dazzling or visual guidance of the driver due to the non-scanning region suddenly becoming bright.

An automotive lamp according to an embodiment includes: a scanning lamp structured to scan a beam in a horizontal direction in a first range of $\theta_1$ to $\theta_2$; and a non-scanning lamp structured to illuminate a second range of $\theta_3$ to $\theta_4$ ($\theta_1<\theta_3<\theta_2<\theta_4$) a part of which overlaps the first range of $\theta_1$ to $\theta_2$. A lighting-off range of $\theta_5$ to $\theta_6$ is determined so as to satisfy a relation $\theta_3<\theta_5<\theta_6<\theta_4$. In a case in which one end of a shaded portion is to be moved toward a target position $\theta_{REF}$ ($<\theta_3$) from an initial position $\theta_{INIT}$ ($>\theta_2$), when the one end of the shaded portion deviates from the lighting-off range of $\theta_5$ to $\theta_6$, the non-scanning lamp is turned on.

This control provides improved coordination between the non-scanning region illuminated by the non-scanning lamp and the scanning region illuminated by the scanning lamp.

Also, the non-scanning lamp may be structured to be gradually turned on with time. This prevents the occurrence of dazzling or visual guidance of the driver due to the non-scanning region suddenly becoming bright.

Specific Description of Embodiment 2

Description will be made below regarding an embodiment 2 with reference to the drawings. The same or similar components, members, and processes are denoted by the same reference numerals, and redundant description thereof will be omitted as appropriate.

Figure 14:
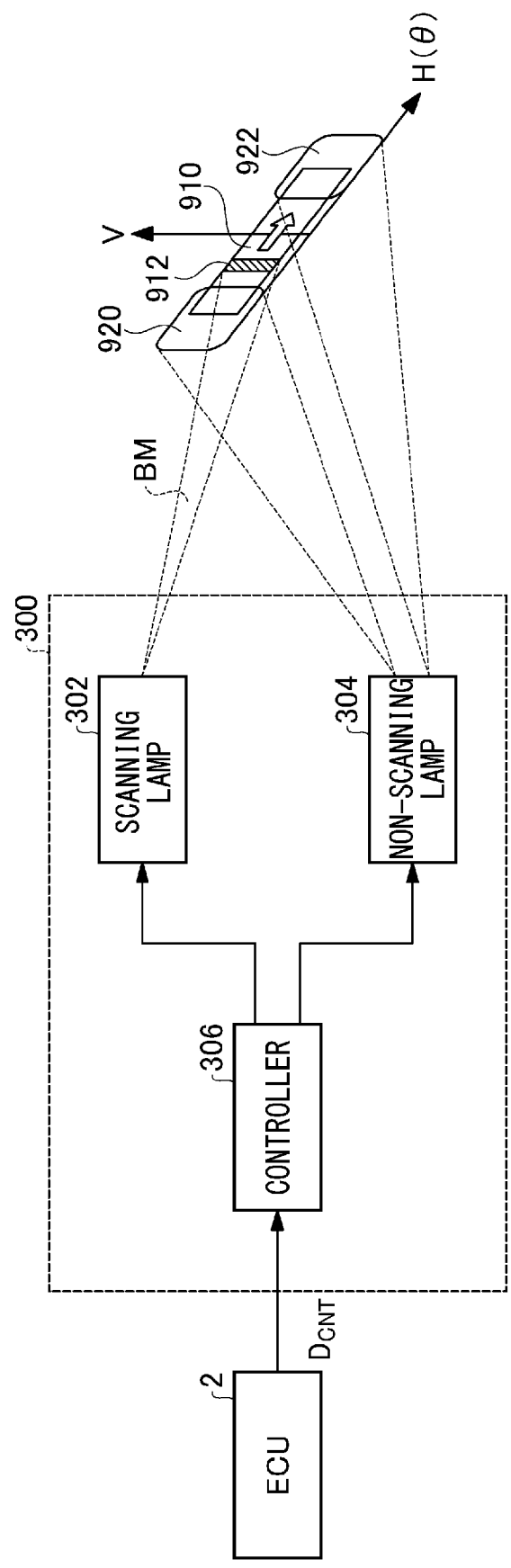
FIG. 14 is a block diagram showing a lamp system provided with an automotive lamp according to an embodiment.

FIG. 14 is a block diagram showing a lamp system provided with an automotive lamp 300 according to an embodiment 2. The automotive lamp 300 is configured as an ADB headlamp employing a scanning method. The automotive lamp 300 forms a light distribution pattern by superimposing light distribution using a scanning method and light distribution using a non-scanning method. The automotive lamp 300 is configured as a combination of a left-side headlamp and a right-side headlamp configured as separate headlamps.

The automotive lamp 300 includes a scanning lamp 302, a non-scanning lamp 304, and a controller 306. The scanning lamp 302 changes the output angle θ of the beam BM in the left-right direction so as to scan an illumination spot 912 formed by the beam BM in the horizontal direction (H direction), thereby forming a scanning region 910. In the scanning, the scanning lamp 302 is capable of controlling the on/off of the beam BM at a desired timing. This allows the scanning lamp 302 to form a shaded portion at a desired position corresponding to the off state of the beam BM. The scanning region 910 other than the shaded portion will be referred to as the "illuminated portion".

The non-scanning lamp 304 illuminates non-scanning regions 920 and 922 a portion of which overlaps the scanning region 910. The non-scanning lamp 304 is configured to be capable of independently controlling the on/off of the non-scanning regions 920 and 922. Preferably, the non-scanning lamp 304 is configured to be capable of changing the light intensity of each of the non-scanning regions 920 and 922.

The controller 306 receives control data $D_{CNT}$ that indicates the light distribution pattern from an ADB Electronic Control Unit (ECU) 4, and controls the scanning lamp 302 and the non-scanning lamp 304 based on the control data $D_{INT}$. For example, the control data $D_{INT}$ may include data that indicates the shaded portion of the light distribution pattern. Also, the control data $D_{INT}$ may include data that indicates the illuminated portion of the light distribution pattern. Also, the control data $D_{INT}$ may include both.

Figure 15:
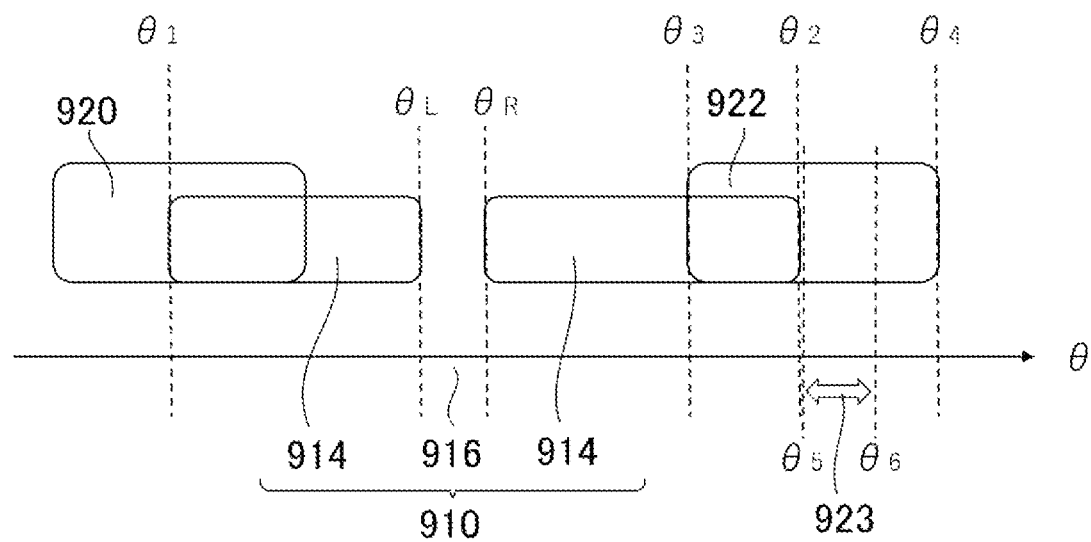
FIG. 15 is a diagram for explaining parameters to be used by the automotive lamp shown in FIG. 14 for controlling the light distribution pattern.

FIG. 15 is a diagram for explaining the parameters to be used for controlling the light distribution pattern by the automotive lamp 300 shown in FIG. 14. Description will be made with the e axis in the horizontal direction assuming that the edge position of each region or portion that forms the light distribution pattern is defined by the angle θ.

The total range of the scanning lamp 302 (maximum width of the scanning region 910) is defined by an angle range of $θ_1$ to $θ_2$. The scanning region 910 can be regarded as a combination of the shaded portion 916 and the illuminated portions 914.

Description will be made regarding coordination between the scanning region 910 and the non-scanning region 922 on the right side. In a case in which the non-scanning region is positioned on the left side, the coordination is the reverse of that described.

The non-scanning region 922 on the right side has a range of $θ_3$ to $θ_4$. In the present embodiment, a lighting-off range 923 $θ_5$ to $θ_4$ that satisfies the relation $θ_3<θ_5<θ_6<θ_4$ is defined. The controller 306 of the automotive lamp 300 controls the lighting-on/off of the non-scanning region 922 based on the position relation between the lighting-off range 923 and the position $θ_R$ of one end (right edge) of the shaded portion 916. In this example the lighting-off range 923 is defined such that the relation $θ_2=θ_5$ holds true.

Figure 16:
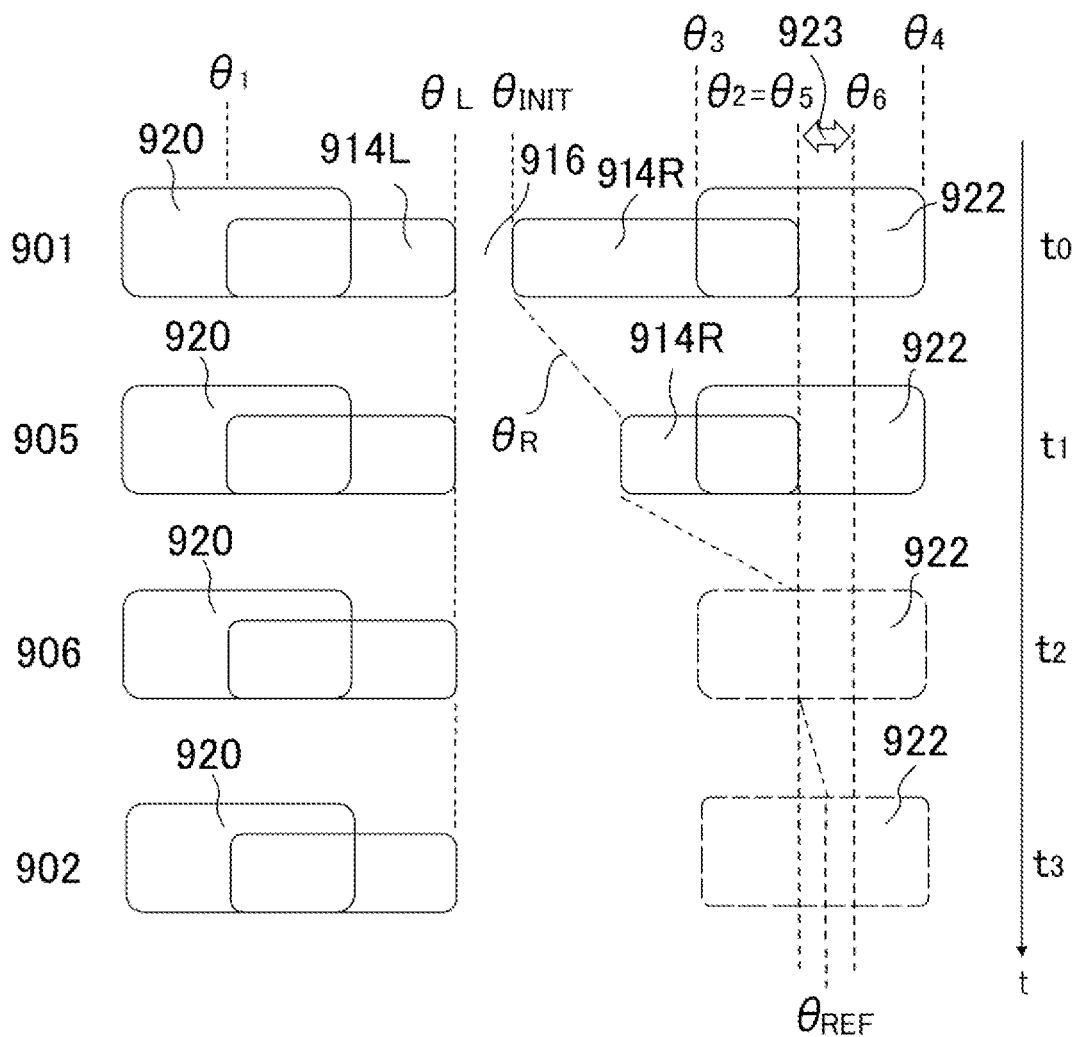
FIG. 16 is a diagram for explaining lighting-off control of a non-scanning region accompanying switching of the light distribution pattern.

FIG. 16 is a diagram for explaining a lighting-off control operation for the non-scanning region 922 accompanying switching of the light distribution pattern. Before the time point $t_0$, the light distribution pattern 901 is formed. At the time point $t_0$, a light distribution pattern 902 after the transition is set. Light distribution patterns 905 and 906 are intermediate light distribution patterns that occur at time points $t_1$ and $t_2$ in the transition, respectively.

When the new light distribution pattern 902 is set at the time point $t_0$, the scanning lamp 302 moves the right-end position $θ_R$ of the shaded portion 916 included in the scanning region 910 from the initial position $θ_{INIT}$ ($<θ_3$) toward the target position $θ_{REF}$ ($>θ_5$). As the shaded portion 916 becomes larger, the width of the illuminated portion 924R on the right side becomes smaller. In this period, the non-scanning region 922 is maintained in the illuminated state. Subsequently, when the right end of the shaded portion 916 reaches $θ_2$, the right-side illuminated portion 914R disappears.

In the present embodiment, the relation $θ_2=θ_5$ holds true. With this, at the time point $t_2$, the right end of the shaded portion 916 reaches the lighting-off range 923. In this stage, the non-scanning region 922 is turned off.

Subsequently, during a period from $t_2$ to $t_3$, the right-end position θR of the shaded portion 916 continues to move toward the target position $θ_{REF}$. However, the illuminated portion 914R has already disappeared. Accordingly, no change occurs in the scanning region 910.

It should be noted that, during a period from the time point $t_2$ to $t_3$, the light intensity for the non-scanning region 922 may preferably be gradually reduced with time.

Figure 17:
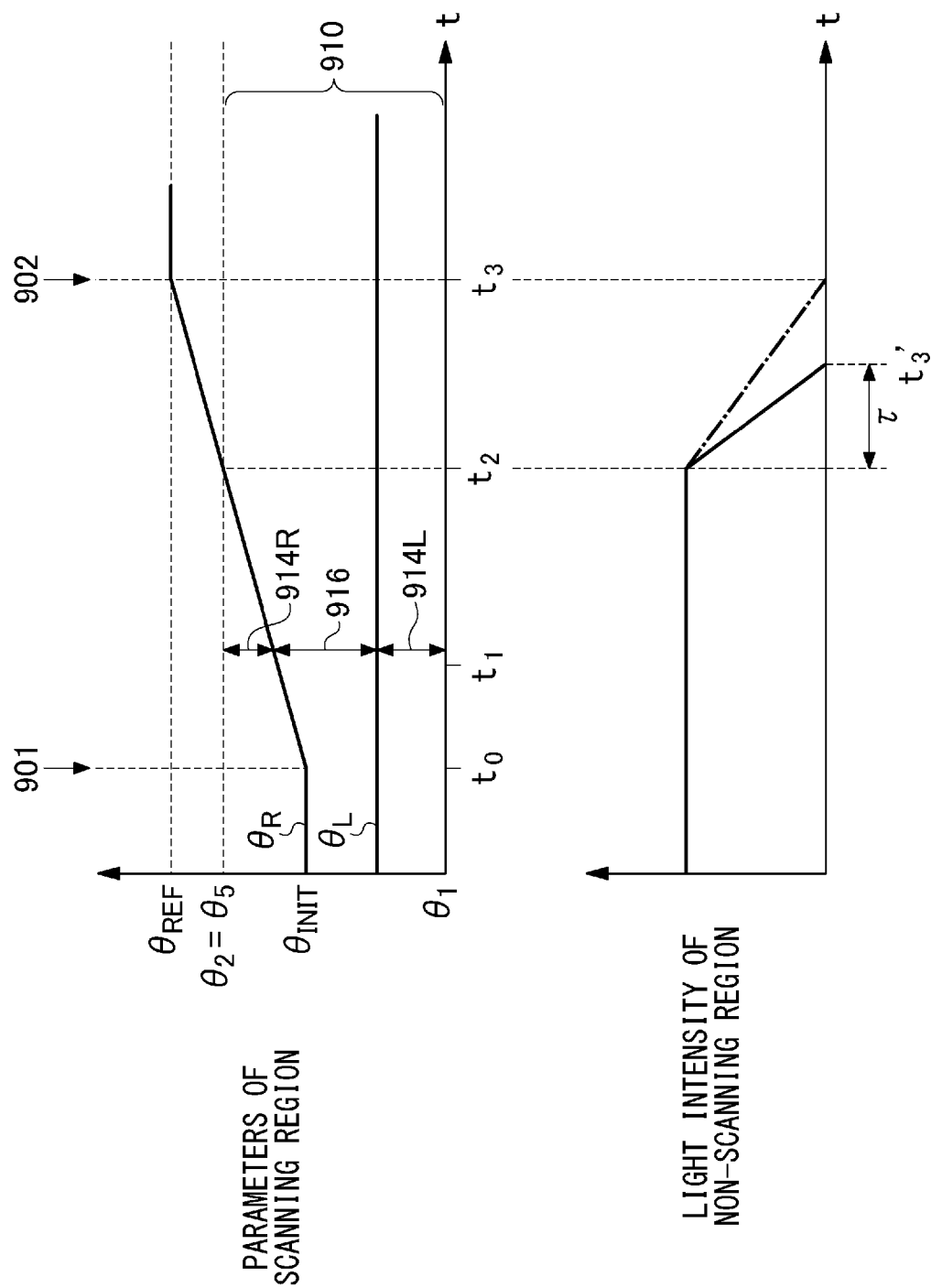
FIG. 17 is a time chart showing the transition of the light distribution pattern shown in FIG. 16.

FIG. 17 is a time chart showing the transition of the light distribution pattern shown in FIG. 16. In FIG. 17, the upper part shows the parameters defined in the scanning region 910, and the lower part shows the light intensity in the non-scanning region 922. As shown in the upper part of FIG. 17, the edge position $θ_R$ of the shaded portion 916 moves toward the target value $θ_{REF}$ with time. When $θ_R=θ_5$ holds true at the time point $t_2$, the light intensity of the non-scanning region 922 starts to decrease with time. When a predetermined time τ elapses at the time point $t_3'$, the light intensity becomes zero. It should be noted that, as indicated by the line of alternately long and short dashes, the non-scanning lamp 304 may be controlled such that the light intensity becomes zero at the time point $t_3$ at which $θ_R=θ_{REF}$ holds true.

Figure 2A:
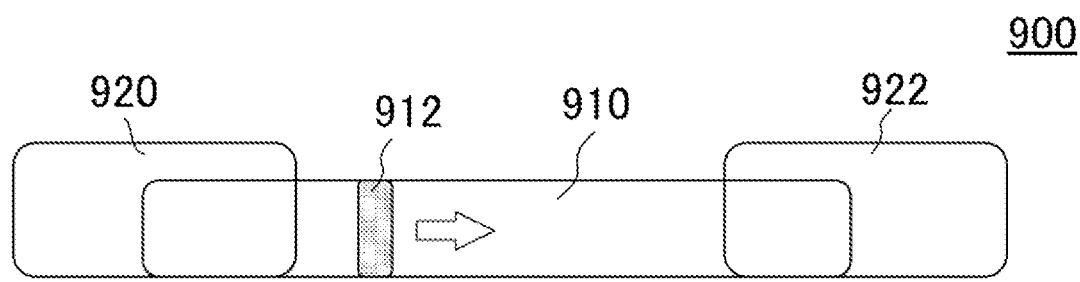
FIGS. 2A through 2C are diagrams for explaining a light distribution pattern formed by a scanning lamp and a non-scanning lamp.
Figure 2B:
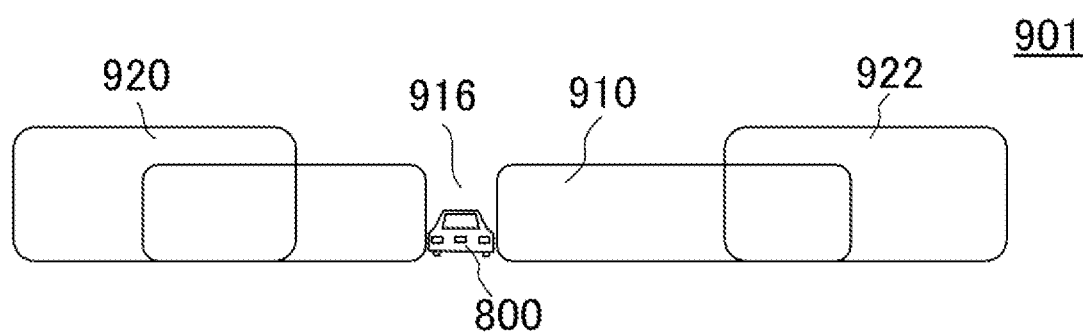
Figure 2C:
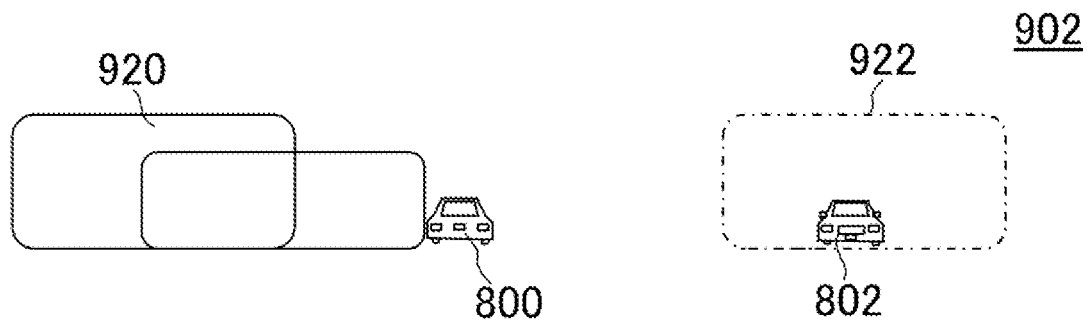
Figure 3:
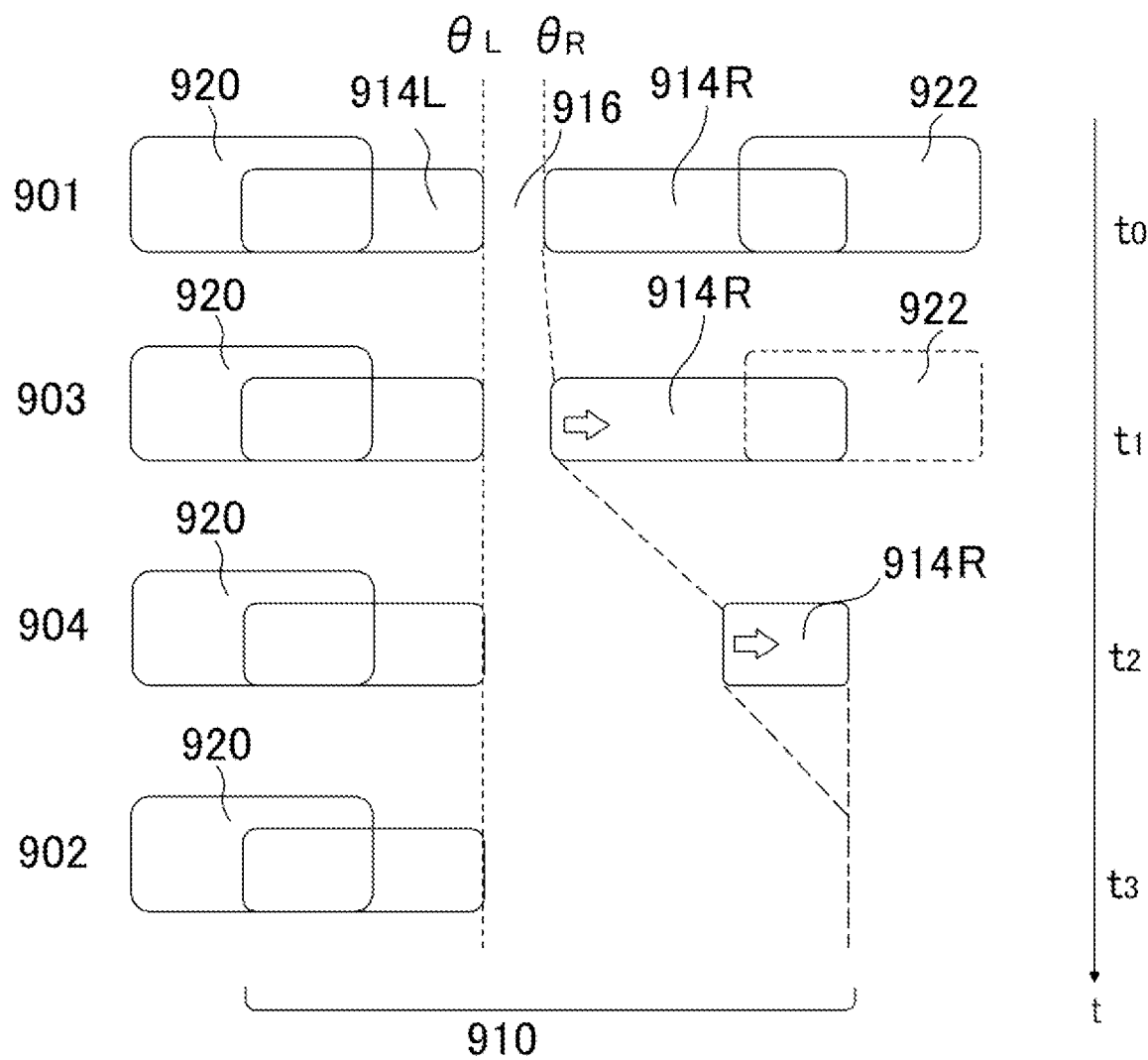
FIG. 3 is a diagram for explaining a control method for gradually changing the light distribution pattern.

The above is the control of the light distribution pattern accompanying lighting-off control of the non-scanning region 922. With this control operation, the non-scanning region 922 on the right side is turned off after the illuminated portion 914R on the right side disappears. This is capable of preventing the illuminated portion 914R from remaining as in an example shown in FIG. 2, thereby reducing a sensation of discomfort imparted to the driver.

Description will be made regarding a case that is the reverse of that described above, i.e., a case in which the light distribution pattern 902 in which the non-scanning region 922 is off transits to the light distribution pattern 901 in which the non-scanning region 922 is on.

Figure 18:
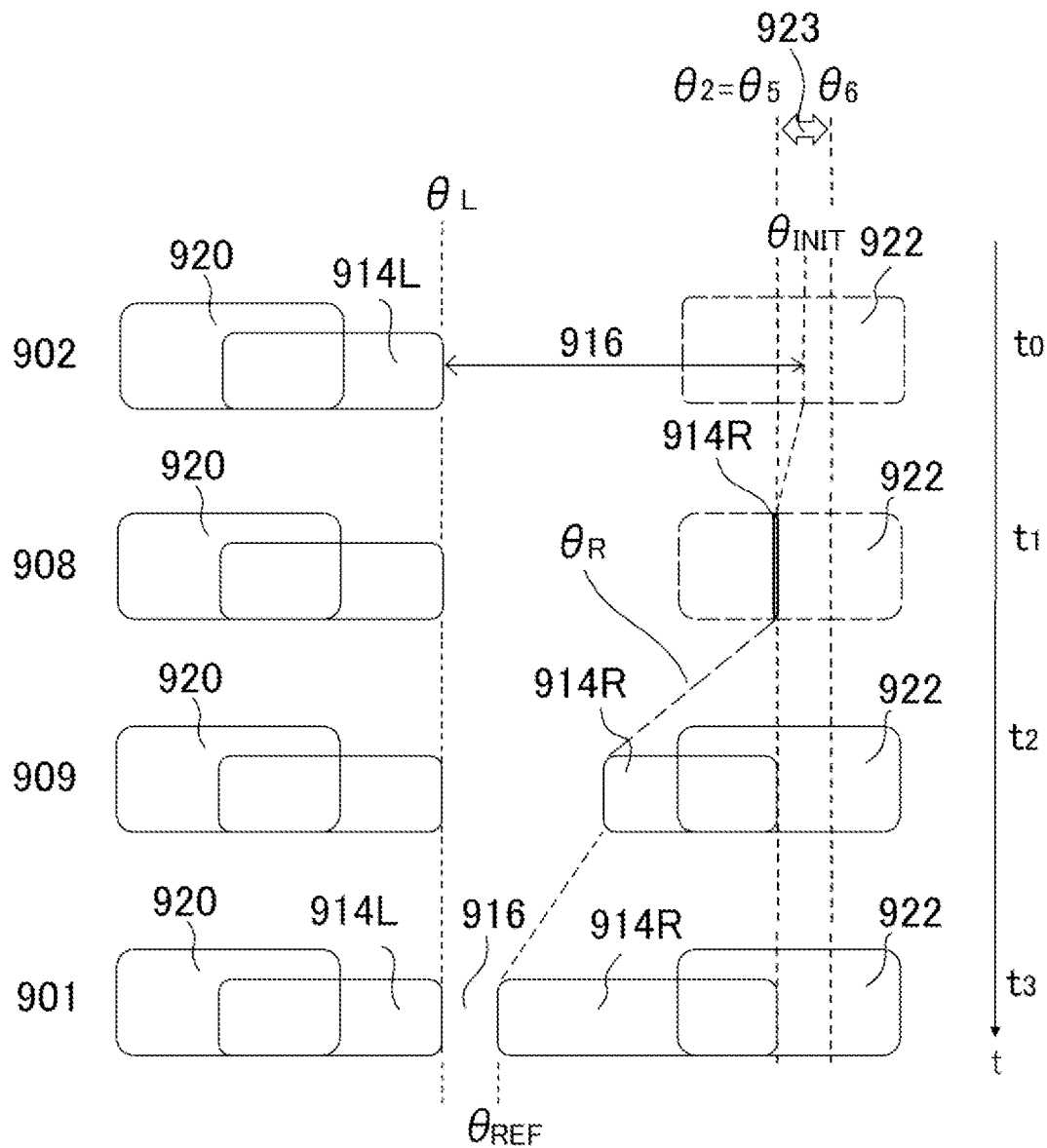
FIG. 18 is a diagram for explaining lighting-on control of a non-scanning region accompanying switching of the light distribution pattern.

FIG. 18 is a diagram for explaining lighting-on control of the non-scanning region 922 accompanying switching of the light distribution pattern. FIG. 18 shows a transition from the light distribution pattern 902 to the light distribution pattern 901. Before the time point $t_0$, the light distribution pattern 902 is formed. In the light distribution pattern 902, the non-scanning region 922 is turned off. The right end OR of the shaded portion 916 of the scanning region 910 is included in the lighting-off range 923. Specifically, the right end $\theta_R$ is positioned at the initial position $\theta_{INIT}$ that satisfies the relation $\theta_5 < \theta_{INIT} < \theta_6$.

At the time point $t_0$, the light distribution pattern 901 after the transition is set. Light distribution patterns 908 and 909 indicate intermediate light distribution patterns that occur at time points $t_1$ and $t_2$ in the transition.

When the new light distribution pattern 901 is set at the time point $t_0$, the scanning lamp 302 starts to move the right-end position $\theta_R$ of the shaded portion 916 included in the scanning region 910 from the initial position $\theta_{INIT}$ toward the target position $\theta REF$ (<$\theta_2$). It should be noted that, during a period from the time point $t_0$ to $t_1$, there is no change in the scanning region 910.

When the right-end position $\theta_R$ of the shaded portion 916 deviates from the lighting-off range 923, the non-scanning region 922 is turned on. Subsequently, when the relation $\theta_R < \theta_2$ holds true, an illuminated portion 914R appears on the right side.

As the right end of the shaded portion 916 moves in the left direction with time, the width of the shaded portion 916 becomes narrower, and the width of the illuminated portion 914R becomes wider.

Subsequently, during a period from $t_2$ to $t_3$, the right-end position $\theta_R$ of the shaded portion 916 continues to move toward the target position $\theta_{REF}$. When the right-end position $\theta_R$ reaches the target position $\theta_{REF}$, the transition ends.

It should be noted that, during a period of a predetermined time $\tau$ from the time point $t_1$, preferably, the light intensity of the non-scanning region 922 may gradually be increased form zero.

Figure 19:
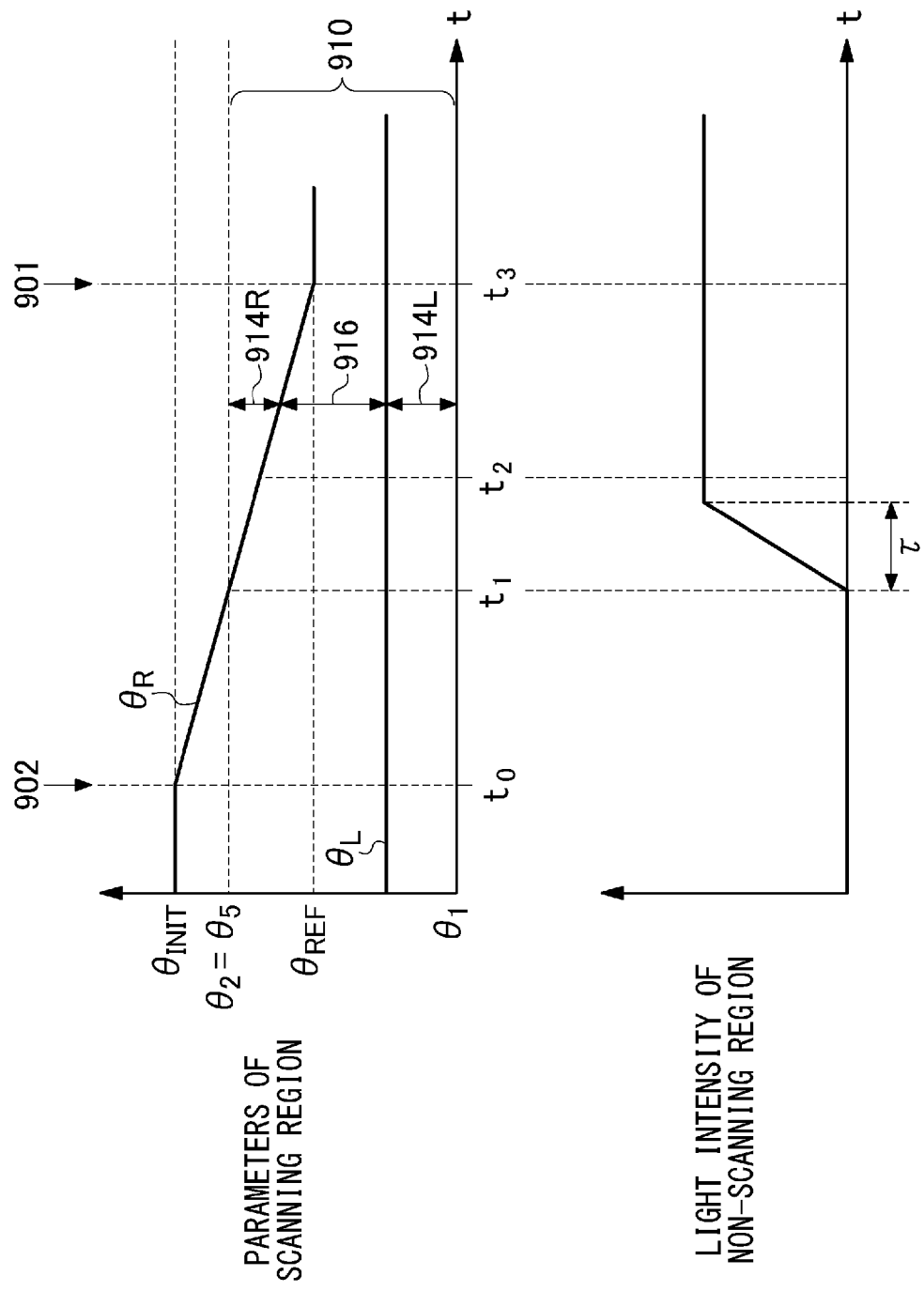
FIG. 19 is a time chart showing the transition of the light distribution pattern shown in FIG. 18.

FIG. 19 is a time chart showing the transition of the light distribution pattern shown in FIG. 18. In FIG. 19, the upper part shows the parameters defined in the scanning region 910, and the lower part shows the light intensity of the non-scanning region 922. As shown in the upper part of FIG. 19, the edge position $\theta_R$ of the shaded portion 916 moves toward the target value $\theta_{REF}$ with time. When $\theta_R = \theta_5$ holds true at the time point $t_1$, the light intensity of the non-scanning region 922 starts to increase with time. When a predetermined time $\tau$ elapses at the time point $t_4$, the light intensity reaches its rated value. Subsequently, the edge position $\theta_R$ of the shaded portion 916 further moves. When the edge position $\theta_R$ reaches the target position, the transition ends.

Figure 20:
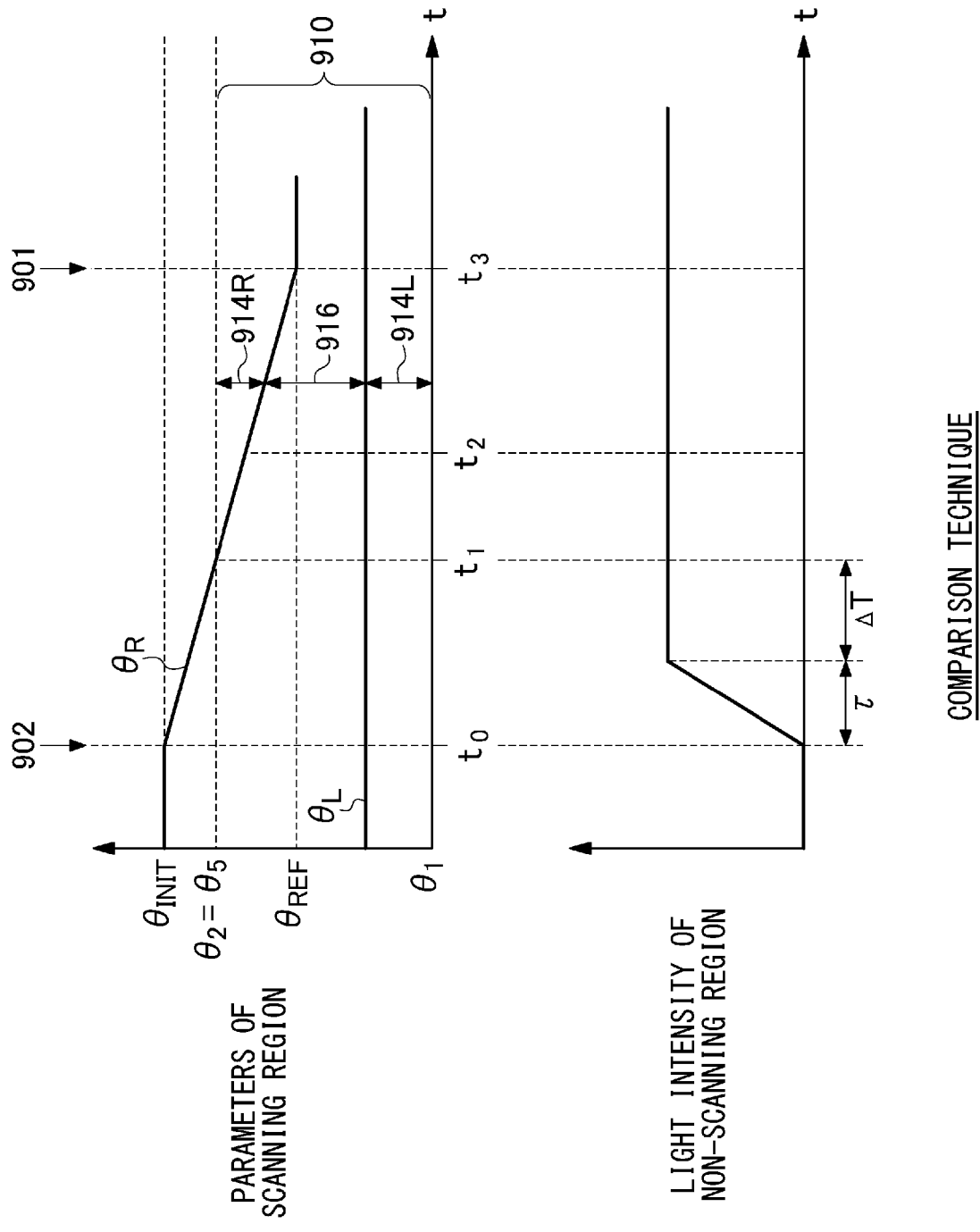
FIG. 20 is a time chart showing the transition of the light distribution pattern according to a comparison technique.

The above is the control of the light distribution pattern accompanied by lighting control of the non-scanning region 922. With this control, this provides improved coordination between the non-scanning region 922 and the scanning region 910. As compared with a comparison technique, this advantage can be clearly understood. FIG. 20 is a time chart showing the transition of the light distribution pattern according to such a comparison technique. With the comparison technique, immediately after the light distribution pattern 902 to be set after the transition is supplied at the time point $t_0$, the light intensity is raised for the non-scanning region 922. Subsequently, when a predetermined time $\tau$ elapses from the time point $t_0$, i.e., at the time point $t_4$, the light intensity reaches its rated value. During a period from the time point $t_0$ to $t_1$, the illuminated portion 914R disappears. After the time point $t_1$, the illuminated portion 914R is extended in a sliding manner. That is to say, in a period $\Delta T$ from the time point $t_4$ to $t_1$, there is no change at all in the light distribution pattern. That is to say, a time lag occurs, leading to a sensation of discomfort imparted to the driver. With the control operation shown in FIG. 19, this solves a problem of such a time lag as shown in FIG. 20, thereby soling a problem of a sensation of discomfort.

Next, description will be made regarding a specific example configuration of the automotive lamp 300. The automotive lamp 300 is configured of separate headlamps, i.e., a right-side head lamp and a left-side headlamp. From among the functions implemented in the automotive lamp 300, the right-side headlamp has a function of illuminating the scanning region 910 and a function of illuminating the right-side non-scanning region 922. On the other hand, from among the functions implemented in the automotive lamp 300, the left-side headlamp has a function of illuminating the scanning region 910 and a function of illuminating the left-side non-scanning region 920. That is to say, the left-side headlamp and the right-side headlamp may be configured to be bilaterally symmetrical.

Figure 21:
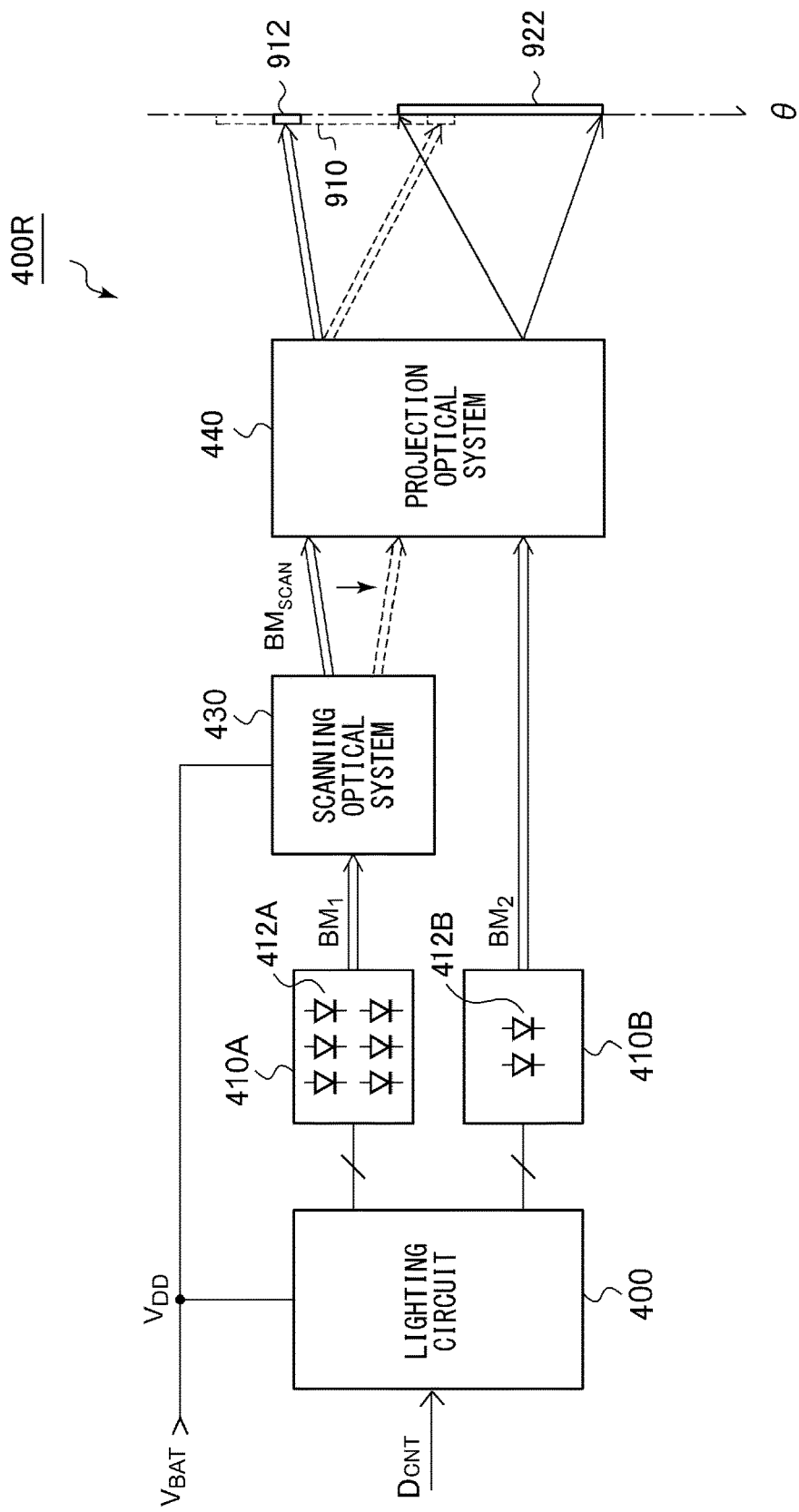
FIG. 21 is a block diagram showing a right-side headlamp according to an embodiment.

FIG. 21 is a block diagram showing a right-side headlamp 400R according to an embodiment 2. The right-side headlamp 400R includes a first light source unit 410A, a second light source unit 410B, a scanning optical system 430, a projection optical system 440, and a lighting circuit 200. The first light source unit 410A is configured as a scanning light source, and includes at least one light-emitting unit 412A. The second light source unit 410B is configured as a non-scanning light source for widely irradiating light to an end region in front of the vehicle. The second light source unit 410B includes at least one light-emitting unit 412B.

The lighting circuit 200, the first light source unit 410A, the scanning optical system 430, and the projection optical system 440 shown in FIG. 21 correspond to the scanning lamp 302 shown in FIG. 14. Also, the lighting circuit 200, the second light source unit 410B, and the projection optical system 440 shown in FIG. 21 correspond to the non-scanning lamp 304 shown in FIG. 14. Also, a part of the configuration shown in FIG. 21 corresponds to the controller 306 shown in FIG. 14.

The scanning optical system 430 repeats periodic motion so as to scan an output beam $BM_1$ output from the first light source unit 410A in the horizontal direction. The output beam output from the scanning optical system 430 will be referred to as a "scanning beam $BM_{SCAN}$". In order to prevent the occurrence of flicker, the scanning frequency of the scanning optical system 430 is set to 60 Hz or more, e.g., on the order of 200 Hz.

The projection optical system 440 projects the scanning beam $BM_{SCAN}$ scanned by the scanning optical system 430 so as to form the scanning region 910. Furthermore, the projection optical system 440 projects an output beam $BM_2$ of the second light source unit 410B so as to from the non-scanning region 920 at least a portion of which overlaps the scanning region 910.

The projection optical system 440 can be configured as a reflective optical system, a transmissive optical system, or a combination thereof. It should be noted that, by appropriately designing the diffusion angle, output angle, etc., of the output beam for each of the first light source unit 410A and the second light source unit 410B, this allows the projection optical system 440 to be omitted.

The lighting circuit 200 independently drives the first light source unit 410A and the second light source unit 410B. The lighting circuit 200 is capable of changing the on/off state of the illumination spot 912 with time in synchronization with the scanning operation of the scanning optical system 430. For example, by setting the luminance of the first light source unit 410A to zero during a given period of time in one scanning period, this is capable of shading a region that corresponds to this period of time. Conversely, by raising the luminance of the first light source unit 410A during a given period of time in one scanning period, this is capable of illuminating a region that correspond to this period of time in a spot-lighting manner. The luminance of the first light source unit 410A may be controlled according to the driving current amount to be supplied to the light-emitting unit 412A. Also, the luminance of the first light source unit 410A may be controlled according to the number of the light-emitting units 412A that are turned on. Also, the luminance of the first light source unit 410A may be controlled according to a combination of these.

Furthermore, the lighting circuit 200 supplies a constant driving current to the second light source unit 410B independently of the scanning operation of the scanning optical system 430. This maintains the luminance of the second light source unit 410B at a constant value, thereby maintaining the illuminance of the non-scanning region 922 at a predetermined value. Moreover, when the light distribution pattern is to be switched, the lighting circuit 200 changes the luminance of the second light source unit 410B with time so as to gradually change the illuminance of the non-scanning region 922. The luminance of the second light source unit 410B may be controlled according to the driving current amount to be supplied to the light-emitting unit 412B. Also, the luminance of the second light source unit 410B may be controlled according to the number of the light-emitting units 412B that are turned on. Also, the luminance of the second light source unit 410B may be controlled according to a combination of these.

Figure 22:
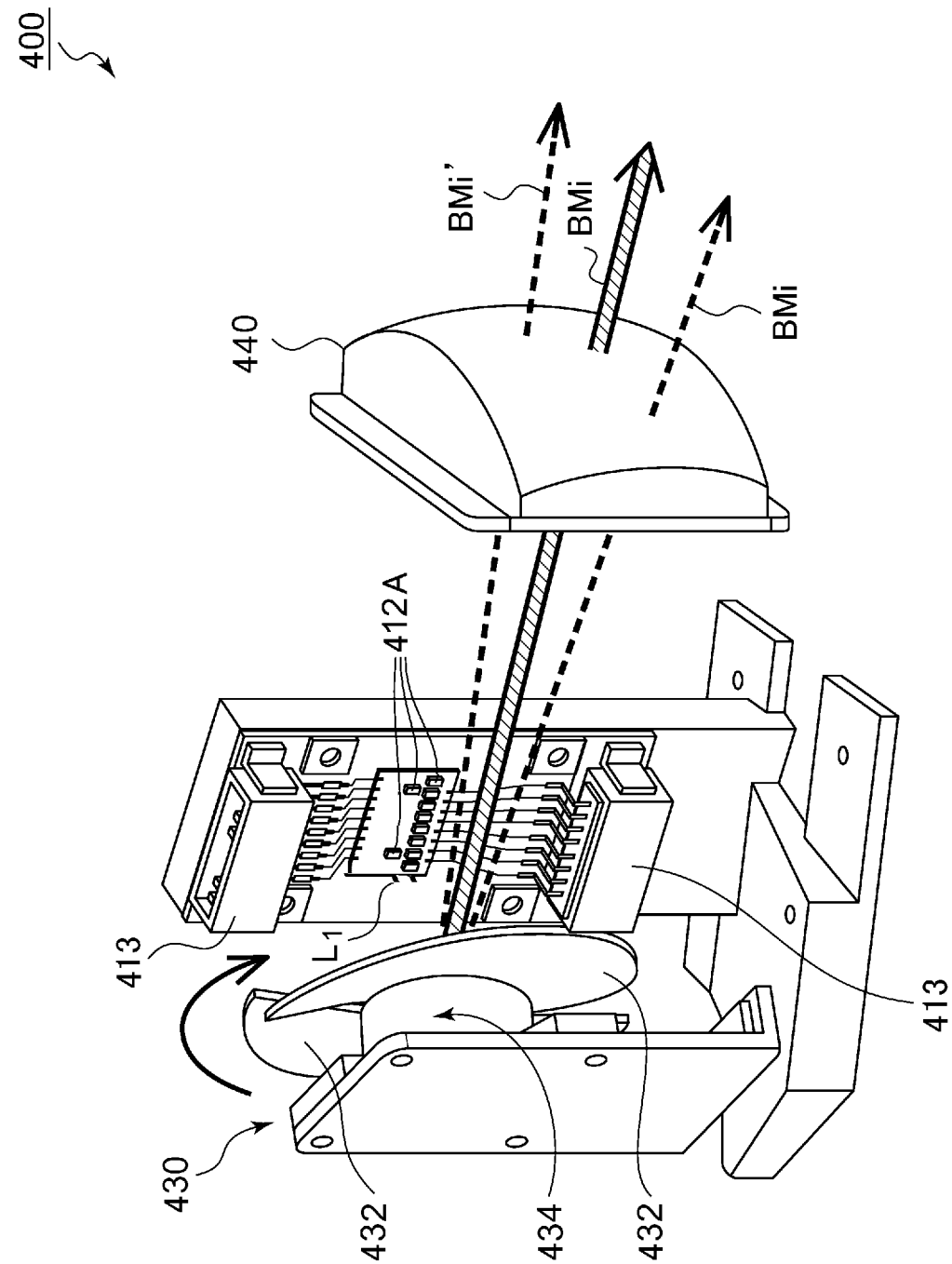
FIG. 22 is a perspective diagram showing a right-side headlamp according to an embodiment.

Next, description will be made regarding a more specific example configuration of the right-side headlamp 400R. FIG. 22 is a perspective diagram showing the right-side headlamp 400R according to the embodiment 2. FIG. 22 shows the first light source unit 410A, the scanning optical system 430, and the projection optical system 440. As described above, the first light source unit 410A includes multiple light-emitting units 412A. The multiple light-emitting units 412A are coupled to an unshown lighting circuit 200 via a connector 413. Each light-emitting unit 412A includes a semiconductor light source such as a light-emitting diode (LED), semiconductor laser (LD), or the like. Each light-emitting unit 412A is configured as a minimum unit for luminance and lighting on/off control. Each light-emitting unit 412A may be configured as a single LED chip (LD chip), or may include multiple LED chips (LD chips) coupled in series or in parallel.

The scanning optical system 430 receives the output light $L_1$ of the first light source unit 410A, and repeats periodic motion so as to scan the reflected light $L_2$ thereof in the horizontal direction (H direction in the drawing) in front of the vehicle. The projection optical system 440 projects the reflected light $L_2$ output from the scanning optical system 430 on a virtual vertical screen in front of the vehicle. The projection optical system 440 may be configured as a reflective optical system, a transmissive optical system, or a combination of them.

Specifically, the scanning optical system 430 includes reflectors 432 and a motor 434. The reflectors 432 are attached to a rotor of the motor 434, and are rotationally driven. In the present embodiment, two reflectors 432 are provided. With this, the output light $L_2$ is scanned twice for every rotation of the motor 434. Accordingly, the scanning frequency is twice the number of revolutions of the motor. It should be noted that the number of the reflectors 432 is not restricted in particular.

By rotating the scanning optical system 430 at a high speed, the illumination spot is scanned on a virtual vertical screen, thereby forming the scanning region 910 in front of the vehicle.

Figure 23:
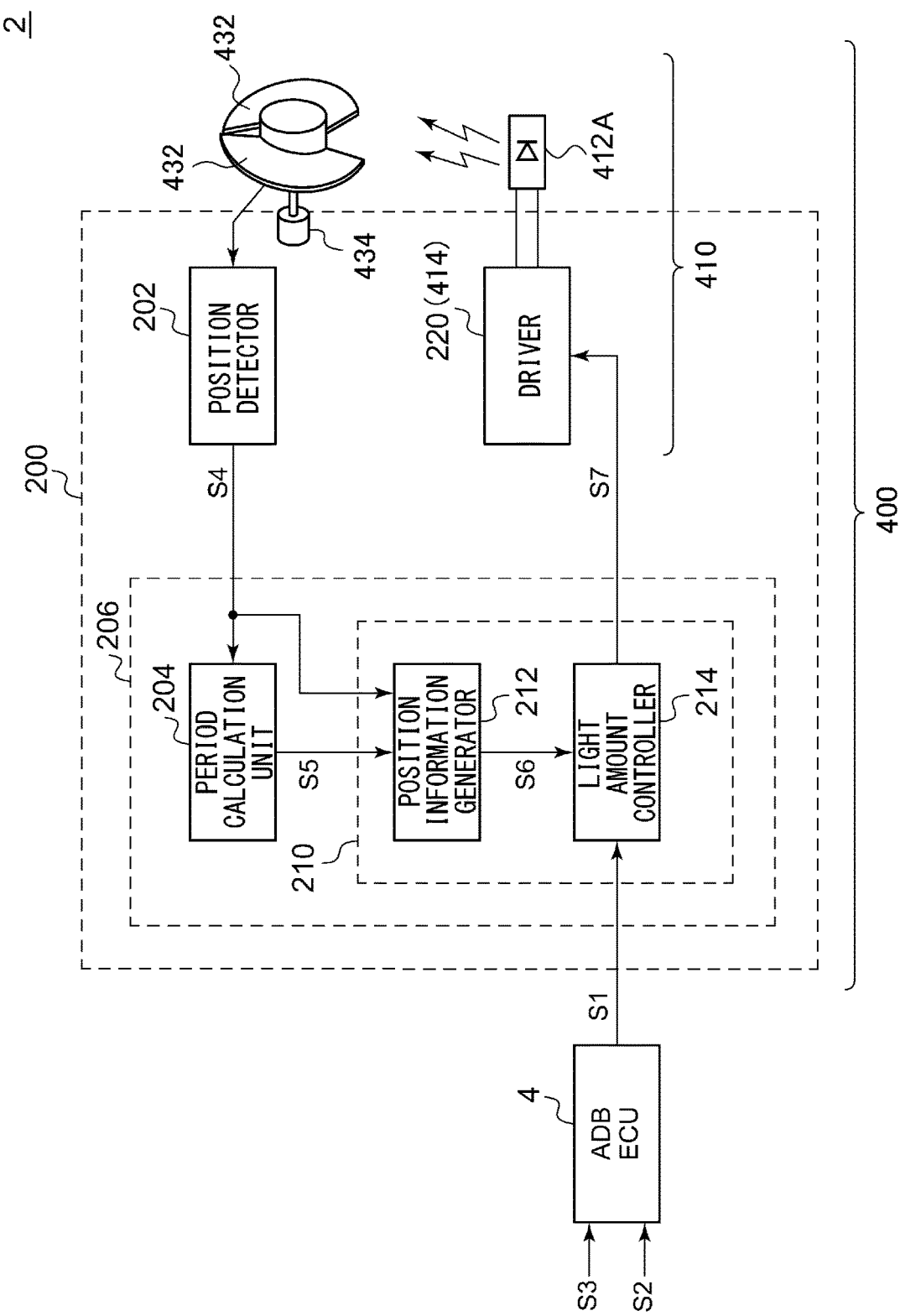
FIG. 23 is a circuit diagram showing an example configuration of the headlamp.

FIG. 23 is a circuit diagram showing an example configuration of a lamp system including the headlamp 400. FIG. 23 shows only components relating to the driving of the one-channel light-emitting unit 412A. The ADB ECU 4 receives camera information S3 and vehicle information S2. The ADB ECU 4 detects a situation in front of the vehicle, and specifically, the position of a target object such as an oncoming vehicle, leading vehicle, pedestrian, etc. based on the camera information S3 Furthermore, the ADB ECU 4 detects the current vehicle speed, steering angle, etc. based on the vehicle information S2. The ADB ECU 4 determines the light distribution pattern to be irradiated in front of the vehicle based on such information, and transmits control data S1 to the headlamp 400 for indicating the light distribution pattern. As described above, the control data S1 includes mode specification data S11 that indicates a light distribution mode (basic light distribution pattern) and shading data S12 that indicates a shaded portion.

The lighting circuit 200 controls the light amount (luminance) of the light-emitting unit 412A based on the control data S1 in synchronization with the rotation of the reflectors 432. The lighting circuit 200 includes a position detector 202, a period calculation unit 204, a light amount calculation unit 210, and a driver 220. A combination of the period calculation unit 204 and the light amount calculation unit 210 will be referred to as a "lamp ECU 206". The lamp ECU 206 can be configured using a microcontroller, microprocessor, Field Programmable Gate Array (FPGA), or an Application Specified IC (ASIC).

The position detector 202 generates a position detection signal S4 that indicates a timing at which a predetermined reference portion of the reflectors 432 passes a predetermined position. For example, the reference portion may be defined by the ends of the two reflectors 432 (a gap between them). Also, the reference portion may be defined by the center of each reflector. That is to say, a desired position may be used as the reference portion.

A Hall element may be mounted on the motor 434 that rotates the reflectors 432. In this case, a Hall signal output from the Hall element has a periodic waveform that corresponds to the rotor position, i.e., the blade position (which will be referred to as the "blade coordinate" hereafter). The position detector 202 may detect a timing at which the polarity of the Hall signal is inverted. Specifically, the position detector 202 may be configured as a Hall comparator that compares a pair of Hall signals.

The period calculation unit 204 calculates the period Tp of the periodic motion of the blade based on the position detection signal S4 output from the position detector 202. For example, in a case in which the position detection signal S4 is an output of the Hall comparator, the period calculation unit 204 measures the edge interval (half-period) of the position detection signal S4. The period calculation unit 204 may be configured as a counter that counts the edge interval using a clock signal. The period calculation unit 204 outputs period information S5 that indicates the measured period.

The light amount calculation unit 210 receives the control data S1, and calculates the light amount to be generated by the light-emitting unit 412A at each time point based on the position detection signal S4 and the period Tp indicated by the period information S5.

For example, the light amount calculation unit 210 is configured as a microcontroller, microprocessor, Digital Signal Processor (DSP), Central Processing Unit (CPU), Application Specified IM (ASIC), or the like, and includes function blocks which will be referred to as a "position information generator 212" and a "light amount controller 214".

The position information generator 212 generates position information S6 that indicates the position of the reflectors 432 at each time point based on the period information S5 and the position detection signal S4. For example, the position information generator 212 may be configured as a counter that is reset at each edge of the position detection signal S4, and that counts up (or counts down) at each unit of time obtained by dividing the period Tp by N (N represents an integer).

The light amount controller 214 calculates a target light amount (lighting-on, lighting-off) of the light-emitting unit 412A at each time point based on the control data S1 and the position information S6, and generates a light amount instruction value S7 that indicates the target light amount.

The correspondence relation between the blade coordinate X (i.e., position information S6) and the irradiation coordinate θ can be derived based on the geometric arrangement relation between the light-emitting unit 412A and the reflectors 432. The light amount controller 214 may include a table that holds the correspondence relation between the position information S6 and the irradiation coordinate θ. Also, the light amount controller 214 may hold a calculation expression that describes their correspondence relation.

With this, the light amount controller 214 may convert the data $θ_L$ and $θ_R$ described by the irradiation coordinate θ included in the control data S1 into the blade coordinate data $X_L$ and $X_R$, so as to determine the light amount at each time point. Alternatively, the light amount controller 214 may convert the blade coordinate X indicated by the position information S6 into the irradiation coordinate θ, so as to determine the light amount at each time point.

When the period Tp is longer than a predetermined threshold value, i.e., when the rotational speed of the motor 434 is slow, the light amount calculation unit 210 preferably turns off the light-emitting unit 412A. In a case in which the light-emitting unit 412A is turned on when the motion period Tp of the reflectors 432 is long, this leads to the driver perceiving flickering (which will also be referred to as "flicker"). In such a situation, by turning off the light-emitting unit 412A, this is capable of preventing discomfort.

For example, when the scanning frequency of the illumination spot SP is equal to or smaller than 50 Hz, the light-emitting unit 412A may be turned off. It is empirically known that, when the scanning frequency becomes lower than 50 Hz, this leads to flicker being perceived by the human eye. It can be said that, in a case in which a pair of reflectors 432 are employed, when the rotational speed of the motor 434 is equal to or higher than 1500 rpm, this involves no perception of flicker.

The driver 220 receives a light amount instruction value S7, and instructs the light-emitting unit 412A to turn on so as to provide the light amount calculated by the light amount calculation unit 210 at each time point.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

What is claimed is:

1. An automotive lamp comprising:
a variable light distribution lamp; and
a controller structured to control the variable light distribution lamp such that the variable light distribution lamp forms a light distribution pattern indicated by control data,
wherein, when a first light distribution pattern is to be changed to a second light distribution pattern, the difference in a number of shaded portions between the first light distribution pattern and the second light distribution pattern being one, the controller switches a control method for gradually changing the light distribution pattern according to a position relation between the shaded portions included in the first light distribution pattern and the shaded portions included in the second light distribution pattern.

2. The automotive lamp according to claim 1, wherein the first light distribution pattern includes a first shaded portion and a second shaded portion,
wherein the second light distribution pattern includes a third shaded portion,
and wherein the controller switches the control method for gradually changing the light distribution pattern according to a position relation between the first shaded portion, the second shaded portion, and the third shaded portion.

3. The automotive lamp according to claim 2, wherein, when both the first shaded portion and the second shaded portion are included in the same illuminated portion in the second light distribution pattern, first one of the first shaded portion and the second shaded portion that is closer to the third shaded portion changes into the third shaded portion, and a second one of the first shaded portion and the second shaded portion that is farther from the third shaded portion gradually disappears with time.

4. The automotive lamp according to claim 3, wherein, the second one is controlled such that both ends the second one move toward a center point of the second one.

5. The automotive lamp according to claim 2, wherein, when the first shaded portion and the second shaded portion are included in different illuminated portions in the second light distribution pattern, a left end of the first shaded portion moves toward a left end of the third shaded portion, a right end of the second shaded portion moves toward a right end of the third shaded portion, and a right end of the first shaded portion and a left end of the second shaded portion move toward a target position included in the third shaded portion.

6. The automotive lamp according to claim 5, wherein the target position is a center of the third shaded portion.

7. The automotive lamp according to claim 2, wherein, when a first one of the first shaded portion and the second shaded portion overlaps the third shaded portion, and when a second one of the first shaded portion and the second shaded portion is included in an illuminated portion of the second light distribution pattern, the first one moves toward the third shaded portion, and the second one gradually disappears with time.

8. The automotive lamp according to claim 7, wherein both ends of the second one move toward a center point of the second one.

9. The automotive lamp according to claim 2, wherein, when both the first shaded portion and the second shaded portion overlap the third shaded portion, a left end of the first shaded portion moves toward a left end of the third shaded portion, a right end of the second shaded portion moves toward a right end of the third shaded portion, and a right end of the first shaded portion and a left end of the second shaded portion move toward a target position included in the third shaded portion.

10. The automotive lamp according to claim 9, wherein the target position is a center of the third shaded portion.

11. The automotive lamp according to claim 1, wherein the first light distribution pattern includes a fourth shaded portion,
wherein the second light distribution pattern includes a fifth shaded portion and a sixth shaded portion,
and wherein the controller switches the control method for gradually changing the light distribution pattern based on a position relation between the fourth shaded portion, the fifth shaded portion, and the sixth shaded portion.

12. The automotive lamp according to claim 11, wherein, when both the fifth shaded portion and the sixth shaded portion are included in the same illuminated portion of the first light distribution pattern, (i) the fourth shaded portion changes into a first one of the fifth shaded portion and the sixth shaded portion that is closer to the fourth shaded portion, and (ii) a second one of the fifth shaded portion and the sixth shaded portion that is farther from the fourth shaded portion gradually appears with time.

13. The automotive lamp according to claim 11, wherein, when the fifth shaded portion and the sixth shaded portion are respectively included in different illuminated portions of the first light distribution pattern, (i) the fourth shaded portion changes into a first one of the fifth shaded portion and the sixth shaded portion that is closer to the fourth shaded portion, and (ii) a second one of the fifth shaded portion and the sixth shaded portion that is farther from the fourth shaded portion gradually appears with time.

14. The automotive lamp according to claim 11, wherein, when one of the fifth shaded portion and the sixth shaded portion overlaps the fourth shaded portion, and when another of the fifth shaded portion and the sixth shaded portion is included in an illuminated portion of the first light distribution pattern, (i) the fourth shaded portion changes into a first one of the fifth shaded portion and the sixth shaded portion that is closer to the fourth shaded portion, and (ii) a second one of the fifth shaded portion and the sixth shaded portion that is farther from the fourth shaded portion gradually appears with time.

15. The automotive lamp according to claim 12, wherein a slit having a narrow width is generated at a center point of the second one that is farther from the fourth shaded portion, and the slit spreads to the second one.

16. The automotive lamp according to claim 12, wherein, when both the fifth shaded portion and the sixth shaded portion overlap the fourth shaded portion, a left end of the fourth shaded portion moves toward a left end of the fifth shaded portion, a right end of the fourth shaded portion moves toward a right end of the sixth shaded portion, and a new illuminated portion gradually appears with time such that it is interposed between the fifth shaded portion and the sixth shaded portion.

17. The automotive lamp according to claim 16, wherein an illuminated portion having a narrow width is generated as a seed at a center point of the new illuminated portion, and the seed is controlled such that it changes into the new illuminated portion.

18. The automotive lamp according to claim 1, wherein the variable light distribution lamp comprises:
a semiconductor light source; and
a reflector structured to receive output light from the semiconductor light source, and to repeat a predetermined periodic motion so as to scan reflected light thereof in front of a vehicle.

19. An automotive lamp comprising:
a scanning lamp structured to scan a beam in a horizontal direction in a first range of $\theta_1$ to $\theta_2$; and
a non-scanning lamp structured to illuminate a second range of $\theta_3$ to $\theta_4$ ($\theta_1<\theta_3<\theta_2<\theta_4$) a part of which overlaps the first range of $\theta_1$ to $\theta_2$,
wherein a lighting-off range of $\theta_5$ to $\theta_6$ is determined so as to satisfy a relation $\theta_3<\theta_5<\theta_6<\theta_4$,
wherein, in a case in which one end of a shaded portion is to be moved toward a target position $\theta_{REF}$ ($>\theta_5$) from an initial position $\theta_{INIT}$ ($<\theta_3$), when the one end of the shaded portion reaches the lighting-off range of $\theta_5$ to $\theta_6$, the non-scanning lamp is turned off.

20. The automotive lamp according to claim 19, wherein the non-scanning lamp is structured to be gradually turned off with time.

21. The automotive lamp according to claim 19, wherein the non-scanning lamp is structured such that, in a case in which the one end of the shaded portion is moved toward a target position θREF ($<\theta_3$) from an initial position $\theta_{INIT}$ ($>\theta_2$), when the one end position $\theta_X$ of the shaded portion deviates from the lighting-off range of $\theta_5$ to $\theta_6$, the non-scanning lamp is turned on.

22. The automotive lamp according to claim 21, wherein the non-scanning lamp is structured to be gradually turned on with time.

23. An automotive lamp comprising:
a scanning lamp structured to scan a beam in a horizontal direction in a first range of $\theta_1$ to $\theta_2$; and
a non-scanning lamp structured to illuminate a second range of $\theta_3$ to $\theta_4$ ($\theta_1<\theta_3<\theta_2<\theta_4$) a part of which overlaps the first range of $\theta_1$ to $\theta_2$,
wherein a lighting-off range of $\theta_5$ to $\theta_6$ is determined so as to satisfy a relation $\theta_3<\theta_5<\theta_6<\theta_4$,
wherein, in a case in which one end of a shaded portion is to be moved toward a target position $\theta_{REF}$ ($<\theta_3$) from an initial position $\theta_{INIT}$ ($>\theta_2$), when one end of the shaded portion deviates from the lighting-off range of $\theta_5$ to $\theta_6$, the non-scanning lamp is turned on.

24. The automotive lamp according to claim 23, wherein the non-scanning lamp is structured to be gradually turned on with time.

* * * * *